US006965450B2

(12) United States Patent
Sweetland et al.

(10) Patent No.: US 6,965,450 B2
(45) Date of Patent: Nov. 15, 2005

(54) METHOD FOR IMAGING MULTIPLE SETS OF AN ELECTRONIC DOCUMENT ON ONE OR MORE IMAGE FORMING DEVICES

(75) Inventors: Robert Sweetland, Fairport, NY (US); Craig W. Jacobs, Patterson, NY (US); Martin F. LoBiondo, Penfield, NY (US)

(73) Assignee: Xerox Corporation, Stamford, CT (US)

(*) Notice: Subject to any disclaimer, the term of this patent is extended or adjusted under 35 U.S.C. 154(b) by 861 days.

(21) Appl. No.: 09/812,483

(22) Filed: Mar. 19, 2001

(65) Prior Publication Data

US 2002/0131065 A1      Sep. 19, 2002

(51) Int. Cl.[7] .............................................. G06F 15/00
(52) U.S. Cl. ...................................... 358/1.18; 358/1.9
(58) Field of Search ............................. 358/1.18, 1.9; 382/128, 100, 232; 709/213, 219, 221

(56) References Cited

U.S. PATENT DOCUMENTS 6,351,547 B1 * 2/2002 Johnson et al. ............. 382/128

* cited by examiner

Primary Examiner—Twyler M. Lamb
(74) Attorney, Agent, or Firm—Fay, Sharpe, Fagan, Minnich & McKee, LLP

(57) ABSTRACT

An imaging control facility allows an operator of an electronic device to submit a single imaging request to image a selected electronic document in multiple imaging formats. The imaging control facility may include an imaging control library that provides visual representations, such as icons, for representing predefined multiple imaging format settings. In addition, the image central facility is drag and drop compatible so that an operator may configure one or more selected image forming devices to image an electronic document in multiple imaging formats by dragging and dropping a selected icon onto a designated target area.

24 Claims, 22 Drawing Sheets

METHOD FOR IMAGING MULTIPLE SETS OF AN ELECTRONIC DOCUMENT ON ONE OR MORE IMAGE FORMING DEVICES

TECHNICAL FIELD

The present invention generally relates to image forming devices, and more particularly relates to a method for imaging an electronic document multiple imaging formats on an image forming device.

BACKGROUND OF THE INVENTION

Electronic devices are often used to create or manipulate an electronic document, such as, a presentation, a spreadsheet, a graphic image, a letter, a memo, or the like. An operator of such an electronic device is often able to image the electronic document in a single imaging format using a single imaging command. However, the operator often needs to image the electronic document in multiple imaging formats, such as, a color image format, a transparency image format, a bond paper image format, and the like. In order for the operator to image the electronic document in multiple image formats, the operator must reconfigure the selected image forming device for each desired imaging format.

The burden of imaging multiple formats of an electronic document requires the operator to reconfigure the image forming device for each desired imaging format and to submit a separate imaging request to the image forming device once reconfigured. Oftentimes to avoid the repetitive burden of reconfiguring the image forming device for each desired imaging format, the operator simply avoids imaging the electronic document in multiple imaging formats. For example, the operator may image five color sets of the electronic document when only one color copy is required, or may image multiple copies of the electronic document on a particular imaging medium, such as bond paper, when only one image copy is required on bond paper.

In addition, an operator that wishes to image the electronic document on one or more image forming devices must submit an individual imaging request to each image forming device. The burden of having to submit multiple imaging requests to multiple image forming devices often results in the operator issuing only a single imaging request and subsequently hand carrying the imaged electronic document to the other desired image forming devices to complete the imaging process. For example, the operator using the electronic host device images the electronic document on a first image forming device, such as a printer. When the printer has completed the image forming operation, the operator then hand carries the imaged electronic document to the facsimile machine to perform a facsimile transition, and in like manner, to the xerographic copier for producing additional copies of the imaged electronic document.

SUMMARY OF THE INVENTION

The present invention addresses the above-described limitations of conventional methods for imaging an electronic document in multiple imaging formats. The present invention provides an approach to enable an operator to image an electronic document in multiple formats by submitting a single imaging command from a host device, such as a computer. The present invention is especially well adapted for use in a network environment that utilizes one or more image forming devices.

In one embodiment of the present invention, a method is practiced in an image reproducing system that allows an operator to submit a single imaging request to an image forming device for the imaging of an electronic document in multiple image formats. In particular, an operator selects one or more property options of a selected image forming device to create the multiple imaging formats of the electronic document or image. Once the operator has finished selecting the properties required to image the electronic document in multiple imaging formats, the operator submits the imaging request to the image forming device using a single imaging command. Additionally, an operator may select default properties, other than the properties predefined by the original equipment manufacturer, for an image forming device to image an electronic document in multiple formats, which are then encapsulated into a selected object. The selected object may be displayed on the operator's display as a visual representation, such as, an icon or a button. In this manner, when the operator selects the visual representation, the object automatically retrieves the electronic document from the software application and issues the default property settings to the image forming device for imaging of the electronic document in multiple imaging formats. Further, an operator using a single imaging command may image multiple formats of the electronic document on multiple image forming devices such as, a printer, a xerographic copier, and a facsimile machine.

The above-described approach benefits operators that need to image an electronic document in multiple formats. With a single imaging command, an operator can instruct one or more image forming devices to generate multiple image formats of the submitted electronic document without any additional operator intervention. This method allows an operator to select and set a preferred multiple imaging format for a number of image forming devices. As a result, the operator can preset a multiple image format requirement in accordance with a client request, or in accordance with an office or business policy, or in accordance with an operator's personal preference, so that with a single imaging command, the operator initiates the imaging of the electronic document in the required multiple imaging formats. Moreover, an operator is still able to image an electronic document in a single imaging format without having to modify any image reproducing properties of an image forming device.

In accordance with another aspect of the present invention, an image reproducing system includes a display for viewing a visual representation of an electronic document. The visual representation on the display may be the electronic document itself, or an iconic visual representation of the electronic document. The system includes an imaging control facility for configuring one or more image forming devices to generate one or more depictions of an electronic document that is provided by the image host device. The control facility may reside at the image host device or in the alternative at the image forming device. Further, the imaging control facility has an imaging control library that provides visual representations, such as icons, that represent the property settings for a selected image forming device in order to image an electronic document in multiple formats. Moreover, an operator by means of an input device, such as a mouse or a touch screen, may take advantage of the drag and drop facility within the imaging control facility to select a visual representation from the control library and to drag and drop a representation onto a target area. Upon the drop of the icon onto the target area, the associated image forming device is configured to generate multiple imaging formats of the electronic document.

The above-described approach, benefits image reproducing systems that utilize multiple image forming devices, because a single drag and drop operation may configure one or more of the image forming devices to generate a multiple format imaging job.

In accordance with another aspect of the present invention, a method is practiced in an electronic apparatus using a computer readable medium. The computer readable medium contains instructions for the electronic apparatus to read and execute. The medium provides a graphical user interface that allows an operator to select properties of one or more image forming devices in order to image an electronic document in multiple formats. The computer readable medium also provides the instructions necessary to encapsulate the selected properties into a object and to provide a visual representation of that object in the form an icon or a button on the display of an electronic host apparatus. The visual representation of the encapsulated objects allows an operator to image the electronic document in multiple formats on multiple image forming devices using one or more mouse clicks, or one or more keystrokes on a keyboard.

BRIEF DESCRIPTION OF THE DRAWINGS

An illustrative embodiment of the present invention will be described below relative to the following drawings.

DETAILED DESCRIPTION OF THE INVENTION

Figure 1:
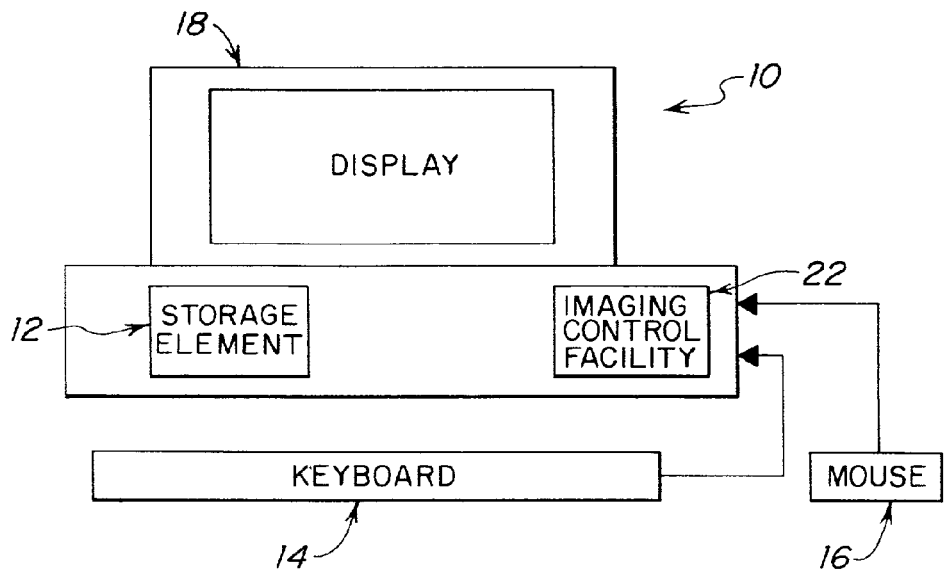
FIG. 1 depicts an electronic device suitable for hosting the imaging control facility.

The illustrated embodiment of the present invention provides a graphical user interface that assists an operator in imaging an electronic document in multiple imaging formats on one or more image forming devices. The graphical user interface provides an operator with a visual representation, such as, an icon on a desktop or a button on a toolbar, that allows the operator to image the electronic document in multiple imaging formats by selecting the visual representation with a mouse or a key stroke on a keyboard. In addition, an image control library may hold a collection of icons. The image control library supports a drag and drop operation by providing an operator with a selection of icons that can be dragged from the library and dropped into a target area. The drag and drop operation also supports the configuration of one or more image forming devices to generate multiple imaging formats of a selected electronic document. The imaging control library along with the toolbar button or the taskbar button, allow an operator to generate multiple imaging formats of an electronic document without having to make or send individual imaging commands to an image forming device for each desired imaging format of an electronic document.

In the illustrative embodiment, an electronic host operator interacting with a software application, such as Microsoft Word®, may initiate a print operation using a single imaging command, such as clicking on a graphical user interface element like a button on a toolbar with a mouse. By selecting the graphical user interface element, the operator configures the selected printer to image one color copy of the electronic document, one black and white copy of the same electronic document, and one transparency copy of the same electronic document. In addition, an operator's multiple imaging format preferences, for example, one black and white copy, three color copies on bond paper, and one set of transparencies, may be encapsulated into an object and represented on the graphical user interface as an icon or other graphical element. The icons facilitate the use of the drag and drop feature depicted by an exemplary embodiment of the present invention. Thus, an electronic host operator may configure an image forming device to generate multiple imaging formats for an electronic document by dragging a visual representation of the desired imaging formats to a target area and dropping the representation onto the target area.

In order to clarify the discussion below, it is helpful first to define a few terms.

A "stock" refers to an imaging substrate or medium on which an imaging reproducing apparatus may image content. The content may be affixed, fused, adhered or otherwise secured to the substrate or medium.

An "object" refers to a structure that encapsulates both attributes and methods. The term "object" is used herein as commonly used within object oriented programming.

An "attribute" refers to a property or characteristic.

A "drag and drop" refers to an operation in which a user captures and moves a visual representation using a pointing device, such as a mouse, from an originating point to a destination point.

A "format" refers to a style and presentation of imaged content on an imaging substrate or imaging medium.

An "electronic document" refers to any self-contained piece of work containing a collection of data or characters, for example, a memorandum, letter, presentation, spreadsheet, or the like, that is created with an application program, and if stored on a storage device, given a unique name by which it can be retrieved.

In the illustrative embodiment, the imaging control facility and the method provided by the present invention are helpful to electronic device operator's that image an electronic document in multiple imaging formats. The imaging control facility increases an operator's efficiency by reducing the number of operator steps taken to image a multiple format imaging job. The illustrative embodiment also enables an operator to select multiple image forming devices for imaging an electronic document such as, a printer, and a xerographic copier, and a facsimile machine with a single imaging command. In this manner, an operator may utilize the facsimile machine to transmit one imaging format of an electronic document to one or more recipients, while at the same time, the xerographic copier is imaging, collating, and stapling the same electronic document. Moreover, the method is suitable for practice in an environment where the image forming device is a shared resource, or where the image forming device is dedicated to a single operator.

FIG. 1 illustrates an electronic host apparatus 10 suitable for hosting the imaging control facility 22. The illustrated electronic host apparatus 10 provides an operator with a display 18, a keyboard 14, a pointing device 16, and a storage element 12. Those skilled in the art will appreciate that the depiction of an electronic host apparatus 10 in FIG. 1 is intended to be merely illustrative and not limiting of the present invention. The present invention requires only that there be at least one image forming device for the imaging control facility 22 to configure. The imaging control facility 22 of electronic host apparatus 10 is suitable to configure a variety of image reproducing devices, such as a printer, a xerographic copier, a facsimile machine, or the like. In addition, imaging control facility 22 is suitable for configuring a variety of printer models, a variety of xerographic copier models, and a variety of facsimile machines, that operate in a network environment. The electronic host apparatus 10 is presumed to operate across various operating platforms, such as UNIX®, any of the Windows® operating environments, LINUX®, Macintosh® platforms, and still host an imaging control facility 22. Nevertheless, those skilled in the art will appreciate that some aspects of the present invention may be practiced without an electronic host apparatus 10 having an imaging control facility 22 resident within.

Figure 4:
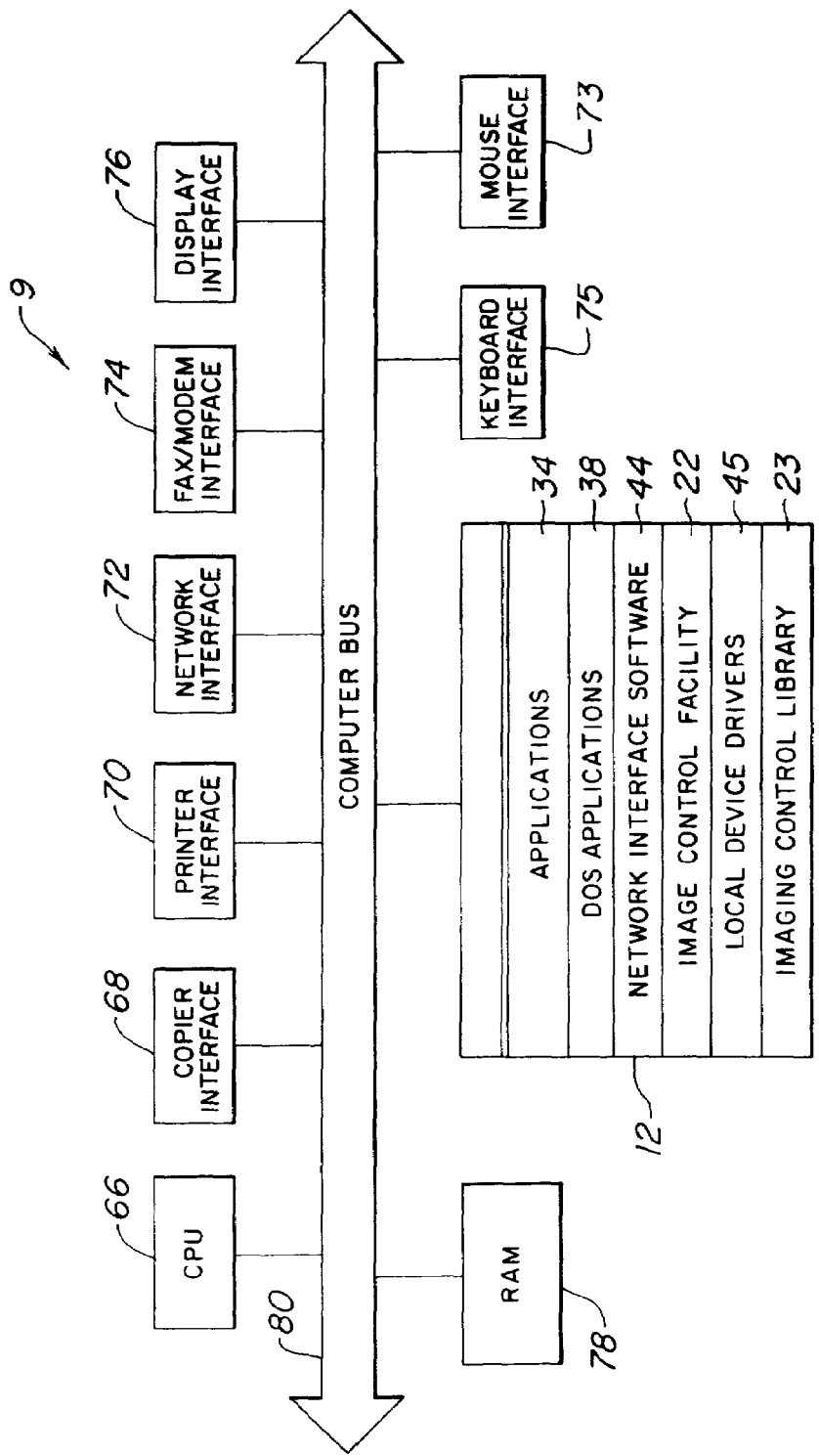
FIG. 4 is a block diagram depicting the interaction of the imaging control facility and the host apparatus.

FIG. 4 illustrates the architecture 9 of electronic host apparatus 10. One skilled in the art will appreciate that FIG. 4 is a block diagram used for illustrative purposes and is not meant to be limiting of the internal hardware or software architecture of electronic host apparatus 10 illustrated in the present invention. Architecture 9 includes a central processing unit (CPU) 66 for interfacing with, and controlling computer bus 80. Also interfacing with computer bus 80 is a local xerographic copier interface 68, a local printer interface 70, a network interface 72, a local facsimile modem interface 74, a display interface 76, a keyboard interface 75, a mouse interface 73, a random access memory (RAM) 78, and storage element 12.

RAM 78 interfaces with computer bus 80 to provide CPU 66 with storage for executed stored program instructions, such as software application 24, or the software driver's for local devices 68, 70, and 74. In particular, CPU 66 loads programs from storage element 12 into RAM 78 and executes these programs out of RAM 78. In accordance with operator instructions, the CPU 66 activates stored application programs, which permit the operator to create, process and manipulate various text and graphical data in an electronic document. For example, a word processing application, such as Microsoft Word®, or a presentation application, such as Microsoft PowerPoint®, may be activated by an operator to create, manipulate, edit and image an electronic document. In addition, CPU 66 in accordance with the operator's instructions, invokes imaging control facility 22, to permit the operator to access the image forming properties of the local image forming devices or the image forming properties of the network image forming devices.

Storage element 12 is capable of storing a variety of Windows® applications 34, DOS applications 38, network interface software 44 such as Novell NetWare®, local device drivers 45, and imaging control facility 22. Imaging control facility 22 will be discussed in more detail below. One skilled in the art will appreciate that FIG. 4 is meant to assist in illustrating an embodiment of the present invention and is not meant to limit the architecture of an electronic device hosting an imaging control facility.

Because of the Windows® operating system popularity, the illustrative embodiment of the present invention is presented assuming an operator is working in a Windows® environment. Therefore, one skilled in the art will recognize that certain terms and standards discussed below are Windows® terms and standards and are not meant to be limiting of the present invention. Nevertheless, the present invention is applicable to other operating platforms and operating systems, such as the Macintosh® operating platform and operating system, the Sun® workstation platform and the Solaris® operating system, or the like.

Figure 7:
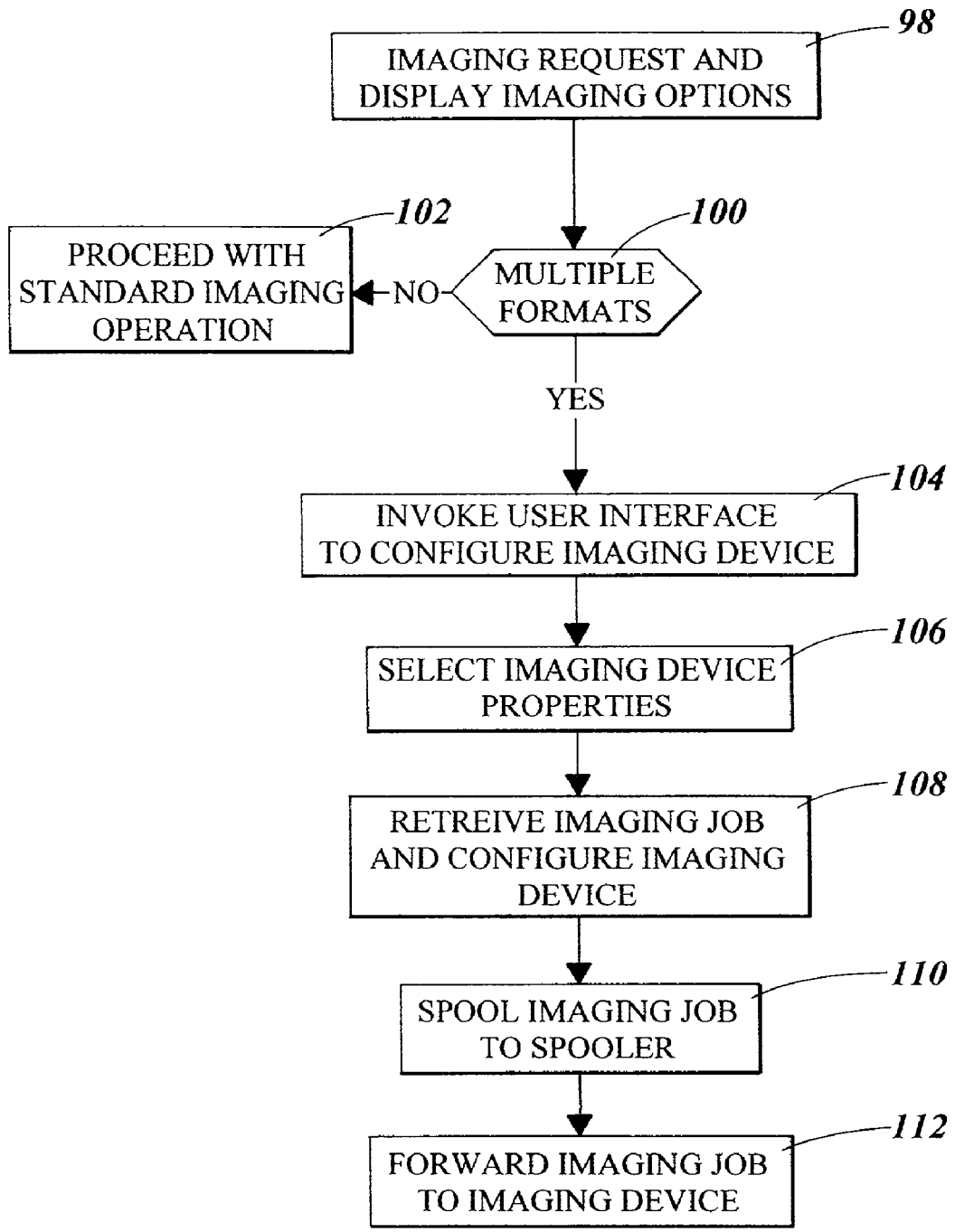
FIG. 7 is a flow chart illustrating the steps taken to image an electronic document in multiple imaging formats.

FIG. 7 provides an overview of the steps performed to image an electronic document in multiple imaging formats. Initially, an operator operates an electronic host apparatus 10 that wishes to image an electronic document in multiple imaging formats. The operator initiates a multiple format imaging request by manipulating a user interface element as will be described in more detail below (step 89 in FIG. 7). Imaging control facility 22 upon receipt of the multiple format imaging request configures the appropriate image forming device or devices to generate the multiple imaging formats, and retrieves the imaging job from the application 24 (step 91 in FIG. 7). Once the appropriate image forming device or devices have been configured, imaging control facility 22 spools the retrieved imaging job to a print spooler (if applicable), which may be a local print spooler, such as the Windows print spooler, or a remote print spooler located in the image forming device or elsewhere in a network environment (step 93 in FIG. 7). The print spooler holds the imaging job until the one or more selected image forming devices are ready to image the electronic document in multiple formats (step 95 in FIG. 7).

As illustrated in FIG. 7, an alternative embodiment of the present invention may be adapted for use with the electronic host apparatus 10 described above. The operator of electronic host apparatus 10 that wishes to image an electronic document initiates the imaging command by manipulating a user interface element, such as described above relative to FIG. 7 (step 98 in FIG. 7). Imaging control facility 22 upon receipt of the imaging request prompts the operator, with a window box or other similar graphical user interface element, to select either a conventional imaging operation, that is, an imaging job in a single imaging format, or an imaging operation using multiple imaging formats (step 100 in FIG. 7). If the operator selects the conventional imaging operation, the imaging control facility 22 retrieves the imaging job from application 24, and spools the imaging job to a print spooler (if applicable) which places the imaging job into a queue until the selected output image forming device is ready to image the electronic document in a single image format (step 102 in FIG. 7).

If the operator selects to image the electronic document in multiple imaging formats, imaging control facility 22 invokes a graphical user interface (step 104 in FIG. 7). The graphical user interface allows the operator of electronic host apparatus 10 to configure one or more image forming devices so that multiple imaging formats of the selected electronic document are generated (step 104 in FIG. 7). The graphical user interface provides the operator with the imaging properties of the available image forming devices, and allows the operator to configure each image forming device with the properties for each desired electronic document imaging format (step 106 in FIG. 7). When the operator has finished selecting the desired properties for each imaging format, the imaging control facility 22 retrieves the imaging job from the application and configures the selected image forming device or devices with the selected image forming properties (step 108 in FIG. 7).

Once the imaging control facility 22 has retrieved the imaging job and configured each selected image forming device, the imaging control facility 22 spools the imaging job to a print spooler (if applicable), which may be a local print spooler, such as the Windows print spooler, or a remote print spooler located at the image forming device or elsewhere in a network environment (step 110 in FIG. 7). The print spooler holds the imaging job until the one or more selected image forming devices are ready to image the electronic document (step 112 in FIG. 7).

Figure 2:
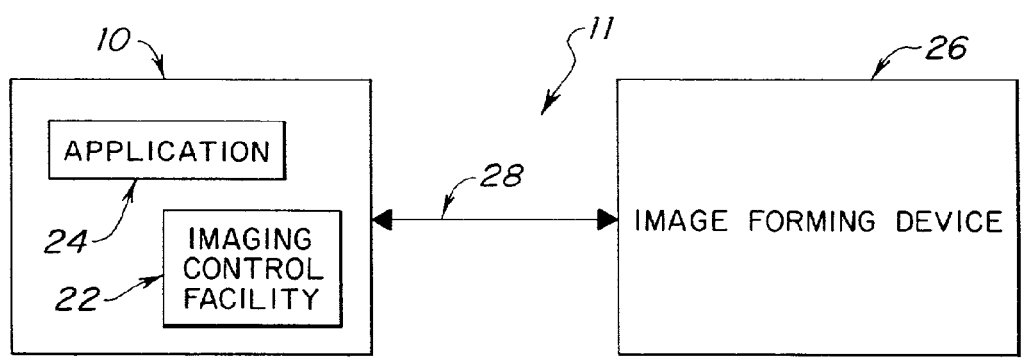
FIG. 2 is a block diagram of an image reproducing system where the imaging control facility is hosted by the electronic device.

FIG. 2 illustrates a communication network 11 that facilitates the exchange of data between an electronic host apparatus 10 and the image forming device 26. One skilled in the art will recognize that the image forming device 26 may be a printer, a scanner, a xerographic copier, a facsimile machine or other image forming device. As illustrated by FIG. 2, the imaging control facility 22 is resident at the electronic host apparatus 10. An operator of electronic host apparatus 10 uses application 24 to create, edit, or view an electronic document. Application 24 may be any software application capable of supporting a print operation. Software applications typically used on electronic host apparatus 10 may include but are not limited to, Microsoft Word®, Microsoft Excel®, Microsoft PowerPoint®, Lotus 123®, WordPerfect®, or any other type of presentation software package, publishing software package, word processing software package, spreadsheet software package, or the like.

Figure 8:
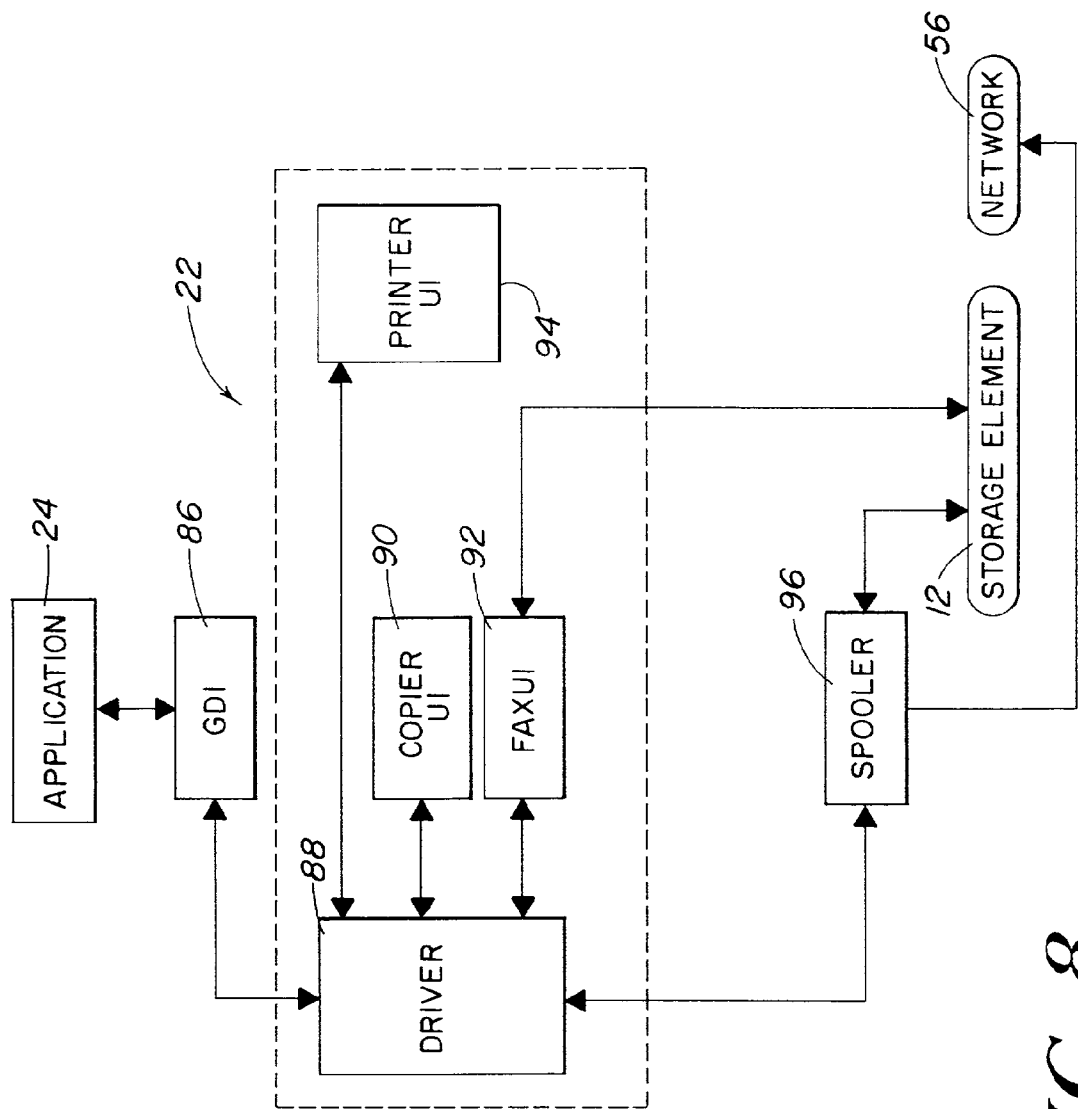
FIG. 8 is a block diagram depicting the interaction of the imaging control facility and a software application.

When the operator of electronic host apparatus 10 wishes to image an electronic document from application 24 in multiple formats, the operator selects a graphical element such as, a button or an icon, that causes application 24 to invoke a standard Graphics Device Interface (GDI) 86, as shown in FIG. 8, which, in turn invokes imaging control facility 22 via communication link 28. Communication link 28 may be any suitable communication link, such as a serial link, a parallel link, an Ethernet link, a wireless link, or the like. Once GDI 86 contacts imaging control facility 22, the imaging control facility 22 can prompt the operator of electronic host apparatus 10 to select the desired image forming properties for of each selected image forming device. Alternatively, the imaging control facility 22 can configure each imaging output device using default settings without prompting the operator for instructions. In addition, the operator of application 24 may select an alternative imaging command that invokes imaging control facility 22 to image the selected electronic document in a single format.

If the operator of electronic host apparatus 10 wishes to customize the imaging property settings selected for a multiple format imaging job, imaging control facility 22 displays a graphical user interface on electronic host apparatus 10. The graphical user interface, which will be discussed in more detail below may be a series of tabbed control pages such as property pages in a property sheet, or other types of graphical user interface elements, that indicate the available image forming properties of the image forming devices. Once the operator has completed selecting the desired image forming properties, the operator of electronic host apparatus 10 returns the property pages with the selected properties back to the imaging control facility 22. If an imaging job is awaiting the just selected image forming properties, imaging control facility 22 configures the selected image forming device or devices in accordance with the just selected properties. Otherwise, imaging control facility 22 stores the just selected image forming properties as the default settings for a multiple format imaging job. One skilled in the art will recognize that having the imaging control facility 22 reside at the electronic host apparatus 10 allows the imaging control facility 22 to benefit from the processing speed and the processing power of electronic host apparatus 10.

Those of ordinary skill in the art will also recognize that the electronic host apparatus 10 may be an electronic appliance, such as an Internet Appliance, a Personal Digital Assistant (hereinafter "PDA"), a wireless communication device such as a mobile telephone, a digital camera, or any other device capable of sending an imaging job via a communication medium to an image forming device for imaging.

Figure 3:
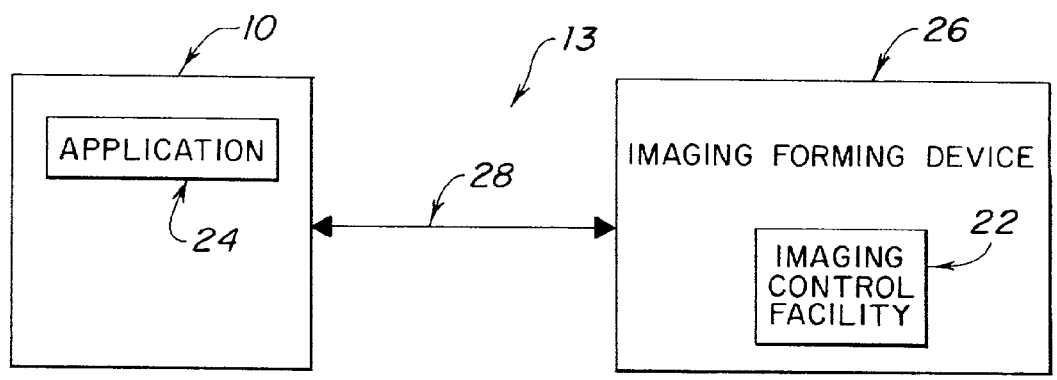
FIG. 3 is a block diagram of an image reproducing system where the imaging control facility is hosted by the image forming device.

FIG. 3 illustrates an alternate embodiment of the present invention. Communication network 13 exemplifies the ability of imaging control facility 22 to reside at the image forming device 26 itself. The imaging control facility 22 in this embodiment operates in the same manner as described above except that the imaging control facility 22 needs to utilize the communication link 28 to communicate with the electronic host apparatus 10 and the application 24. For example, the imaging control facility 22 via the communication link 28 is able to retrieve an imaging job from software application 24 through GDI 86, and then configure image forming device 26 to image the electronic document.

Figure 5:
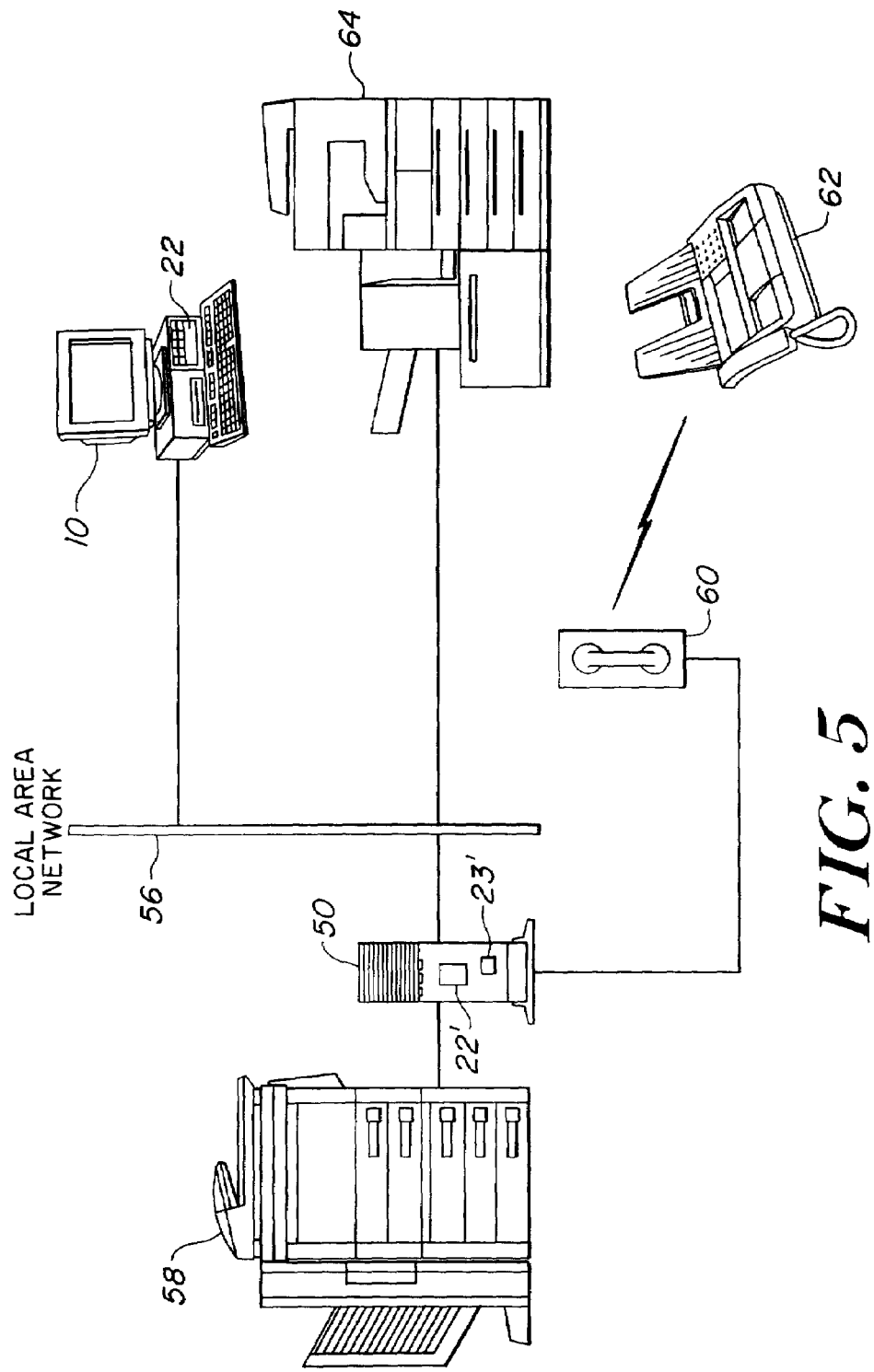
FIG. 5 is an illustrative local area network that is suitable for practicing the present invention.
Figure 6:
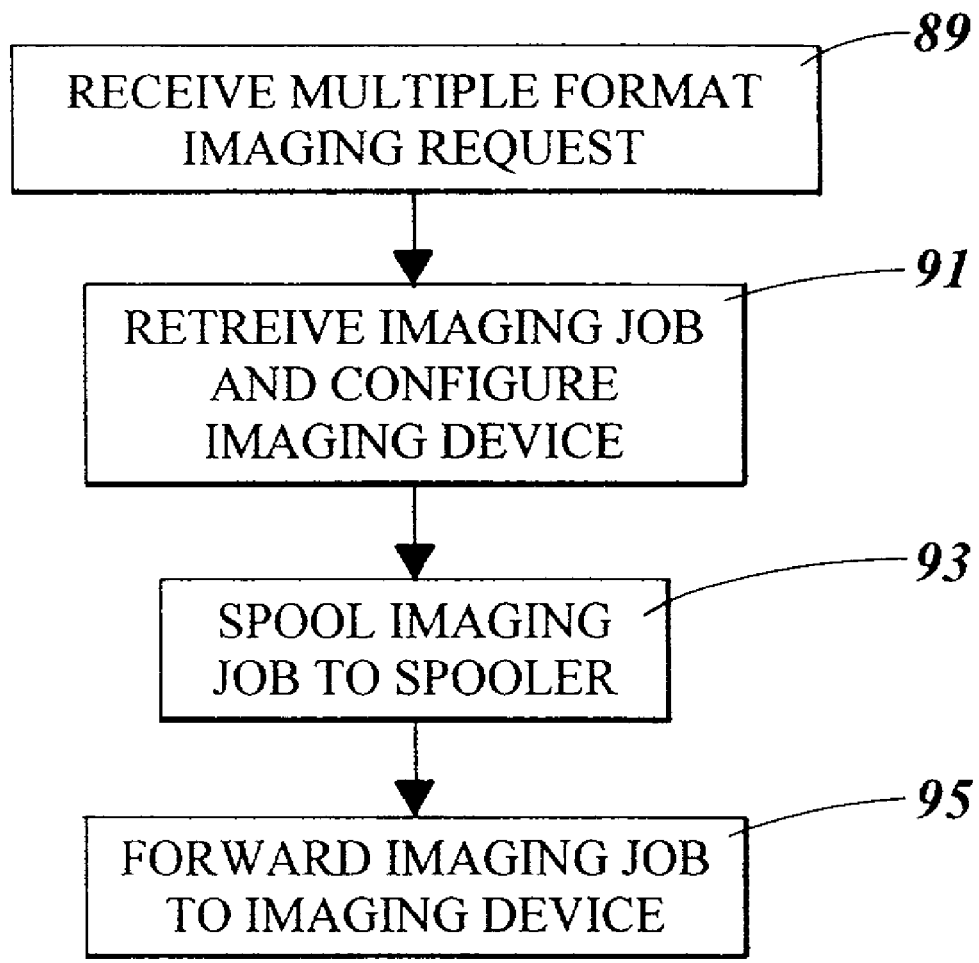
FIG. 6 is a flow chart illustrating the steps taken to image an electronic document.

FIG. 5 illustrates a local area network 56 that allows an operator of electronic host apparatus 10 to image one or more formats of an electronic document on multiple image forming devices. In FIG. 5, the imaging control facility 22 is illustrated to reside on the electronic host apparatus 10, but one skilled in the art will recognize that server 50 is also a suitable host for the imaging control facility 22 as depicted by 22'.

As depicted in FIG. 5, an operator of electronic host apparatus 10 may utilize imaging control facility 22 to select one or more image forming devices in the local area network 56. For example, an operator may wish to utilize printer 64 to image a color set of transparencies for a presentation, and to use xerographic copier 58 to image double-sided black and white copies of the same presentation. In addition, the operator may wish to transmit a single copy of the same presentation via modem 60 to a remote facsimile machine 62. Imaging control facility 22 allows an operator of electronic host apparatus 10 to select desired image forming properties for each available image forming device in communication with local area network 56 in order to generate multiple imaging formats of an electronic document. Once the operator has selected the desired image forming properties for one or more of the selected image forming devices, imaging control facility 22 configures each selected image forming device according to the selected image forming properties and retrieves the imaging job from software application 24 through GDI 86 for imaging. One skilled in the art will recognize that modem 60 may be a circuit card present within electronic host apparatus 10, or alternatively may be a facsimile server.

FIG. 8 illustrates the relationship and interaction between software application 24 and imaging control facility 22. As discussed above, software application 24 may be a Windows® based application that allows an operator to create, edit, and image an electronic document. When an operator submits an imaging command, software application 24 invokes a standard Graphics Device Interface (GDI) 86, which in turn invokes imaging control facility 22. If the operator desires to image the electronic document in a single format, as indicated by the imaging command header, or other suitable manner, driver 88 assembles the imaging job from software application 24 and spools the imaging job to spooler 96. In a conventional manner, spooler 96 then forwards the imaging job over the local area network 56 to a network image forming device if a network image forming device is selected by the operator. In a similar manner, driver 88 is able to forward the imaging job from application 24 to a local image forming device.

If the operator of electronic host apparatus 10 submits an imaging command for imaging the electronic document in multiple formats, either on a single image forming device or on multiple image forming devices, imaging control facility 22 invokes driver 88 to interface with the one or more of the selected image forming devices. The selected image forming device or devices is indicated in either the header of the imaging command for multiple imaging formats, or is indicated in the body of the imaging command along with the associated image forming properties for each image forming device. In the case where the operator of electronic host apparatus 10 submits an imaging command having no image forming properties in the body of the imaging command, driver 88 invokes the graphical user interface that represents each identified image forming device such as printer user interface 94, or xerographic copier interface 90, or facsimile user interface 92 so that the operator may select the desired image forming properties. Alternatively, driver 88 may invoke graphical user interface 274 which makes the appropriate calls to printer user interface 94, to xerographic copier user interface 90, and facsimile interface 92 to provide an operator with a seamless graphical user interface for selecting image forming properties.

Printer user interface 94 along with xerographic copier interface 90 and facsimile interface 92 will be discussed in more detail below. In addition, printer user interface 94, xerographic copier interface 90, and facsimile interface 92, may be implemented as Dynamic Link Libraries (DLL) so that when a DLL is called, the DLL polls its associated image forming device to determine the current imaging format property settings.

In the case where the operator of the electronic host apparatus 10 selects tab control element 280 from graphical user interface window 274, driver 88 invokes copier user interface 90 for interaction with the operator. Xerographic copier tab control element 280 will be discussed in more detail below. When the operator of electronic host apparatus 10 wishes to transmit a facsimile of the selected electronic document to one or more remote users and selects tab control element 278 from graphical user interface 274, driver 88 invokes facsimile user interface 92. Facsimile user interface 92 allows the operator to select the desired image forming properties of the facsimile, which will be discussed in terms of tab control element 278 in more detail below. Further, facsimile user interface 92 is capable of accessing storage element 12 to select a standard facsimile cover sheet template and to access an operator's address book for the addresses and facsimile numbers of the intended facsimile recipients.

Figure 9:
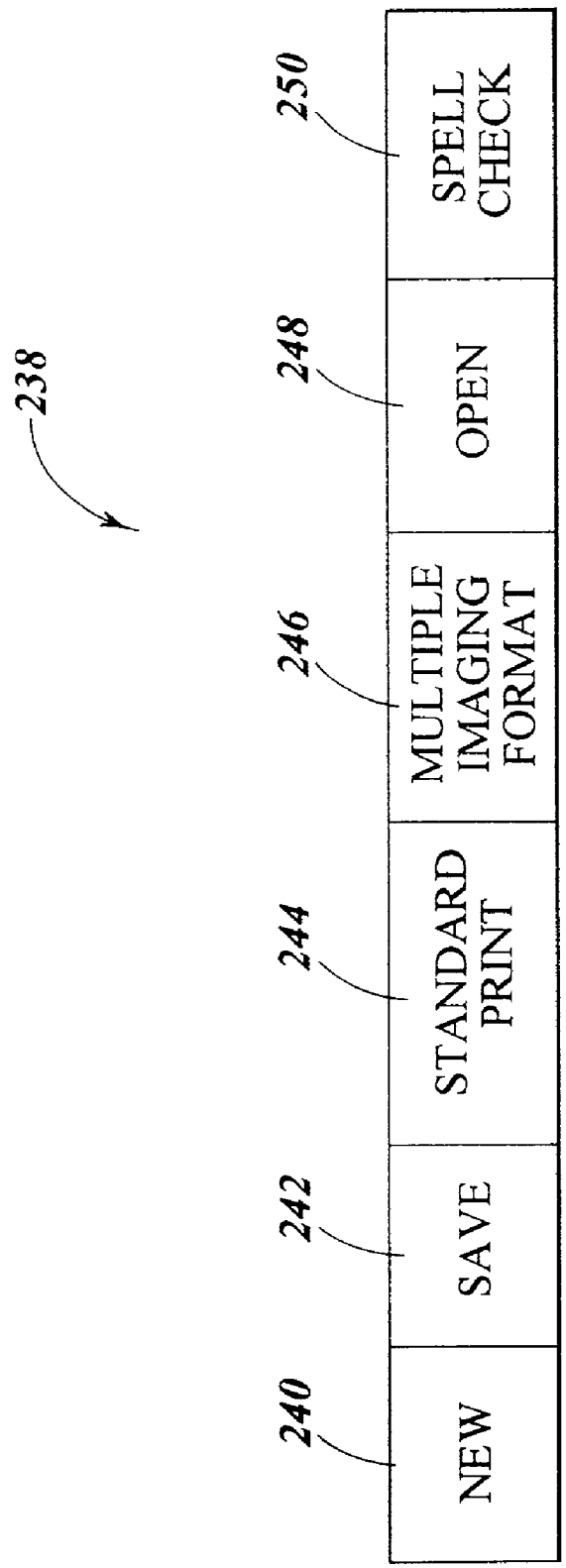
FIG. 9 depicts an exemplary menu bar of its present invention.

In operation, the macro or function call to initiate a multiple imaging format process of the present invention may be implemented as a button or icon on a toolbar or taskbar of software application 24. As illustrated in FIG. 9, a toolbar 238 depicts an exemplary row of buttons used to invoke an application function. An operator of electronic host apparatus 10 may choose one of the buttons displayed on toolbar 238 with either keyboard 14 or mouse 16. One skilled in the art will recognize that toolbar 238 is meant to illustrate the implementation of the present invention and is not intended to be limiting thereof. As illustrated by toolbar 238, an operator may select the button labeled NEW 240 to create a new electronic document, or may select the button labeled SAVE 242 to save changes to a new or existing electronic document, or may select the button labeled OPEN 248 to open an existing electronic document, or may select the button labeled SPELL CHECKER 250 to invoke a support application to verify spelling in the electronic document.

In addition, toolbar 238 is capable of displaying one or more print command buttons. A first print command button, depicted as STANDARD PRINT at toolbar location 244 may be used by an operator of software application 24 to image one or more copies of a selected electronic document in a single imaging format. In addition, a multiple format imaging command button is available at toolbar location 246, so the operator may initiate a predefined multiple format imaging job. The use of the multiple format imaging command button 246 on toolbar 238 allows the operator of software application 24 to initiate a multiple format imaging job using a single imaging command or request. The details of the multiple imaging format button 246 will be discussed in further detail below.

Figure 10:
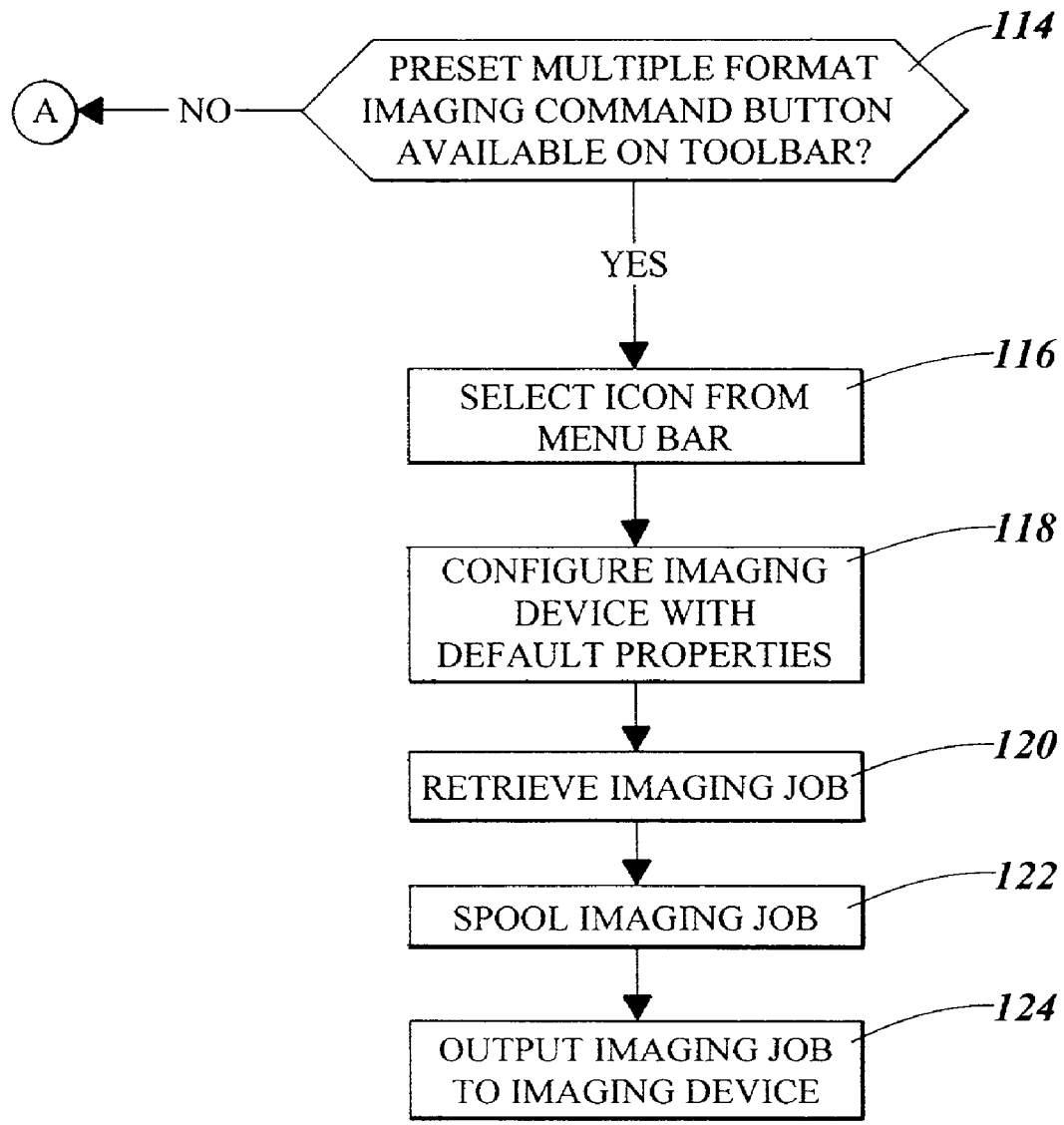
FIG. 10 is a flow chart illustrating steps for generating multiple formats of an electronic document when a visual representation is available.
Figure 11:
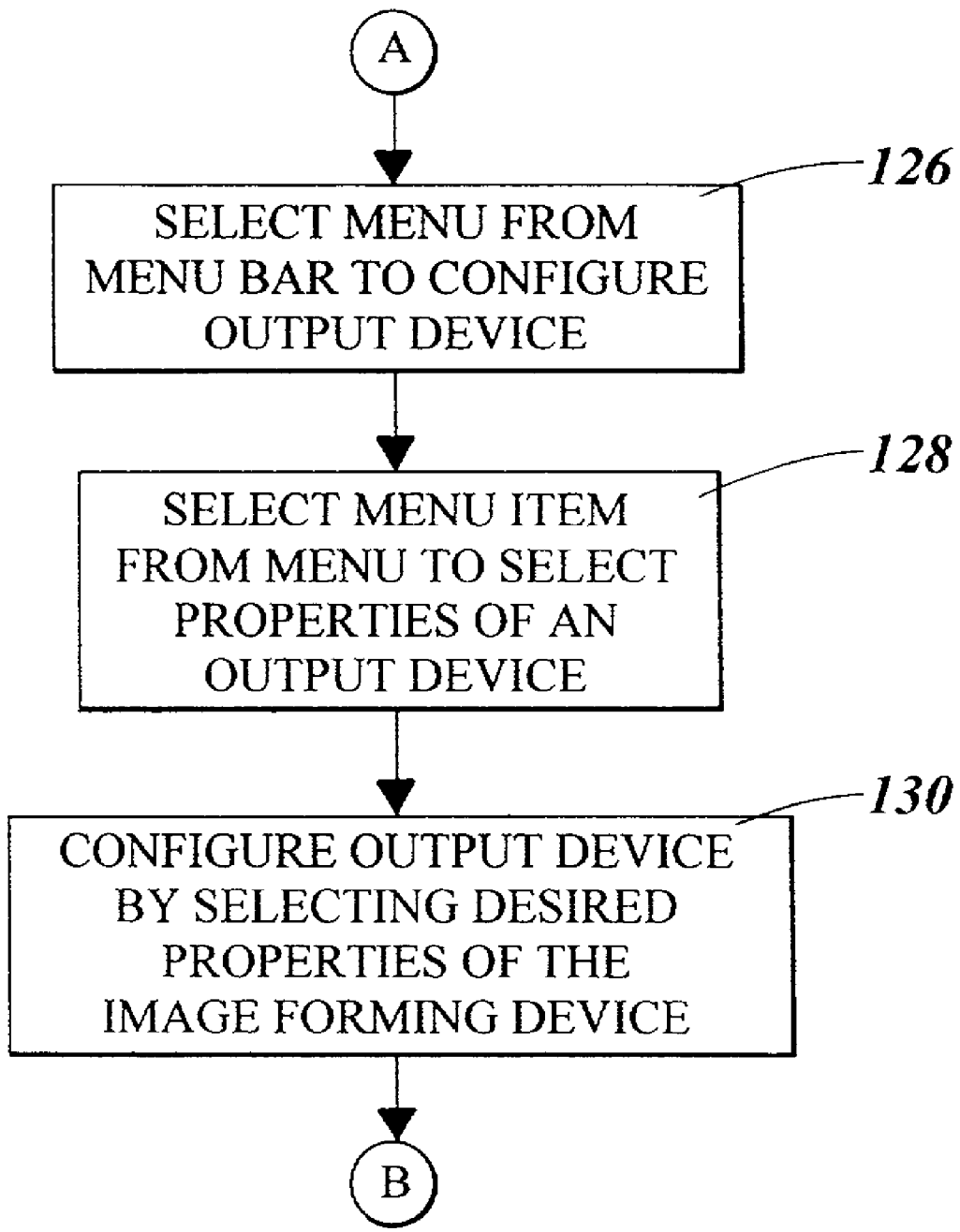
FIG. 11 is a continuation of the flow chart depicted in FIG. 10.
Figure 12:
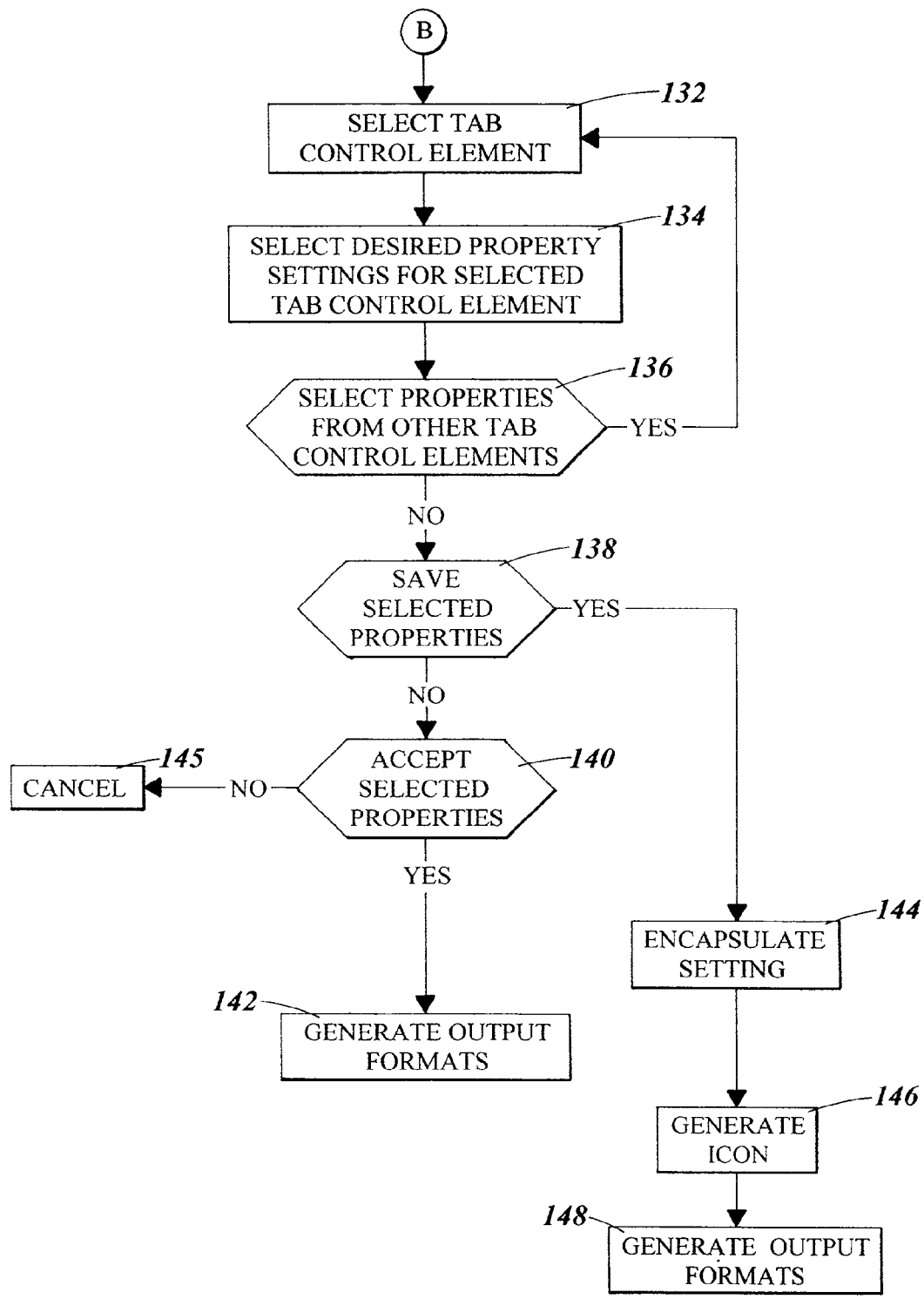
FIG. 12 is a continuation of the flow chart in FIG. 11.

With reference to FIGS. 11 and 12 an operator of software application 24 that wishes to image an electronic document in multiple imaging formats may select the multiple imaging format button 246 from toolbar 238 to initiate a multiple format imaging job (step 114 in FIG. 10). If multiple imaging format button 246 is not available on toolbar 238 of software application 24, an operator must take additional steps to initiate a multiple format imaging job, which will be discussed in more detail below (step 114 in FIG. 10). When the operator selects the multiple imaging format button 246 from toolbar 238, or alternatively a visual representation, such as an icon displayed on the desktop of electronic host apparatus 10 (step 116 in FIG. 10), imaging control facility 22 automatically configures the one or more preselected image forming devices with the operator's preselected multiple image forming properties (step 118 in FIG. 10). Once imaging control facility 22 has configured the preselected image forming device or devices, imaging control facility 22 retrieves the imaging job from software application 24 through GDI 86 (step 120 in FIG. 10).

When imaging control facility 22 has retrieved the imaging job from software application 24, the imaging control facility 22 then spools the imaging job to local spooler 96 or alternatively to a network spooler (not shown) (step 122 in FIG. 10). From the local spooler 96, the imaging job is then forwarded to each selected image forming device for imaging in accordance with the multiple imaging format property settings selected for each image forming device (step 124 in FIG. 10).

If toolbar 238 does not display multiple imaging format button 246, or if the operator wishes to select a different set of multiple imaging format property settings for the imaging job, the operator can select the appropriate menu from a menu bar of software application 24 and command the imaging control facility 22 to invoke graphical user interface 274 (step 126 in FIG. 11). Once graphical user interface 274 is invoked, the operator may configure one or more image forming devices for a multiple format imaging job (step 128 in FIG. 11). Using mouse 16 or keyboard 14 of electronic host apparatus 10 the operator selects the appropriate graphical user interface elements to select properties necessary to create multiple imaging formats of an electronic document. Graphical user interface 274 utilized for the selection of image forming device properties to image an electronic document in multiple imaging formats will be discussed in further detail below.

Figure 13:
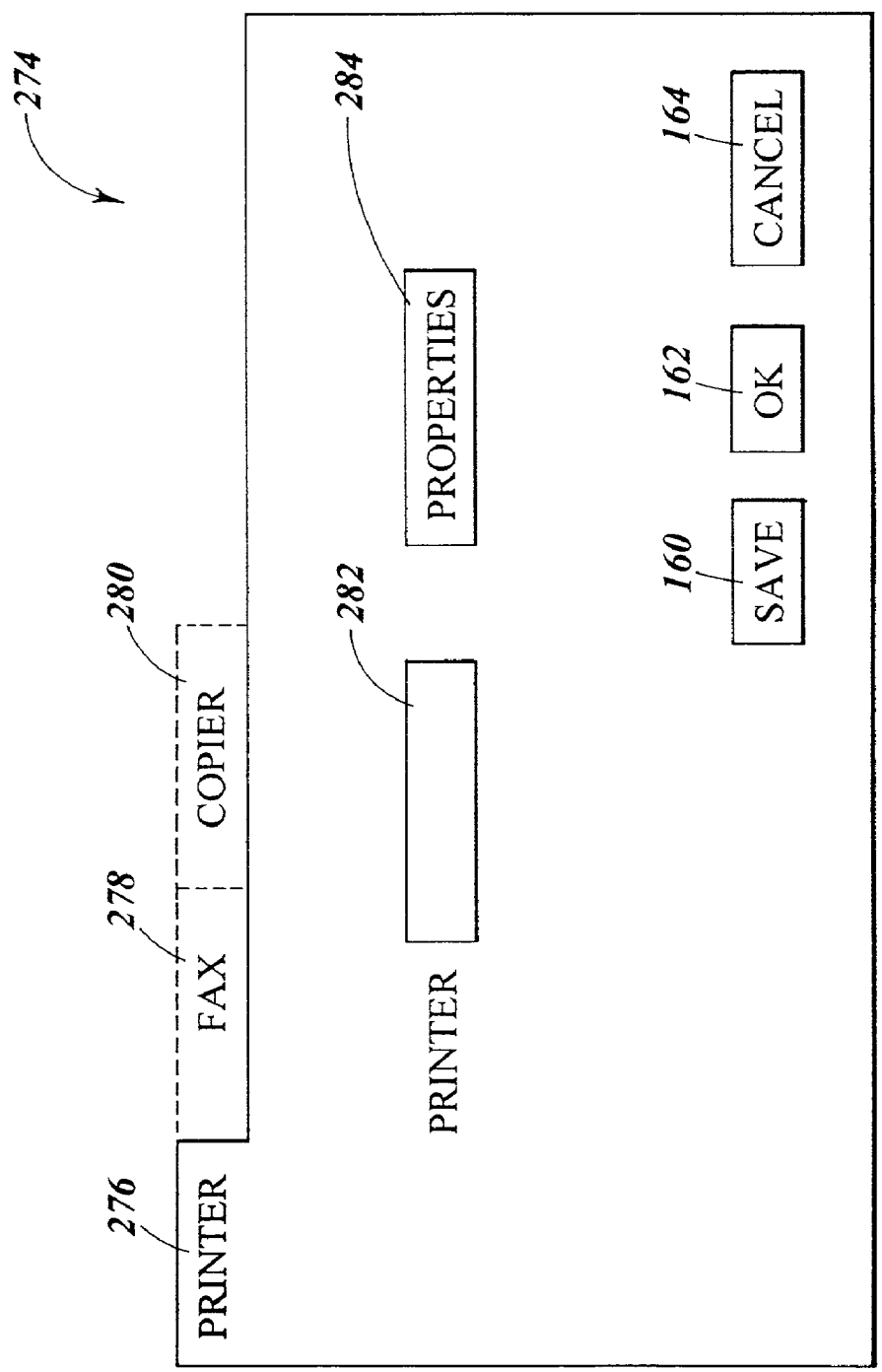
FIG. 13 depicts a user interface for selecting properties of an image forming device.

As illustrated in FIG. 13, graphical user interface 274 illustrates exemplary tabbed control elements suitable for configuring multiple image forming devices to image an electronic document in multiple imaging formats (step 130 in FIG. 11). One skilled in the art will appreciate that graphical user interface 274 may be implemented to display properties of a single image forming device or alternatively may be expanded upon to include tabbed control elements for each image forming device available to the electronic host apparatus 10. In addition, one skilled in the art will recognize that graphical user interface 274 may be implemented as any type of graphical user interface dialog box that supports the selection of peripheral device properties.

As depicted by graphical user interface 274, the operator of electronic host apparatus 10 may select printer tab control element 276, or facsimile tab control element 278, or xerographic copier tab element 280 (step 132 in FIG. 12). The tabbed control elements represent the graphical user interfaces for each type of available image forming device such as, printer user interface 94, xerographic copier user interface 90, and facsimile user interface 92. The tab control elements allow the operator to configure a selected image forming device, so that when the operator initiates a multiple imaging format command, the selected device images the imaging job in multiple imaging formats.

In addition, graphical user interface 274 provides an operator with buttons, or other graphical user interface elements, to save the selected properties, to cancel the selected properties, or to submit the selected multiple image forming properties to the image forming devices without saving the property selections. An operator may save the selected multiple image forming properties by selecting SAVE button 160. SAVE button 160 may be implemented to encapsulate the selected multiple image forming properties into an object for deposit in the imaging control facility library of imaging control facility 22, or as an object that is linked to a button or an icon on the toolbar of software application 24. OK button 162 allows the operator of electronic host apparatus 10 to invoke imaging control facility 22 to configure the selected image forming devices with the selected multiple image forming properties and initiate the multiple format imaging job without saving the selected property settings. Additionally, graphical user interface 274 provides a CANCEL button 164 in the event that the operator makes a mistake or decides not to go through with imaging the electronic document in multiple imaging formats.

Once an operator has selected the tab control element for the desired image forming device, and has selected an available image forming device, the operator's selection of the properties button, for example properties button 284, invokes the appropriate image forming device graphical user interface (step 134 in FIG. 12). Typical image forming device user interfaces include printer graphical user interface 94, xerographic copier graphical user interface 90, and facsimile graphical user interface 92.

With reference to the printer tab control element 276, if more than one printer is available to the electronic host apparatus 10 for imaging, the operator may use list box 282 to select an available printer. Once the operator has selected an available printer, the operator may then select properties button 284 to select the desired image forming property settings for the printer identified in list box 282.

Figure 14:
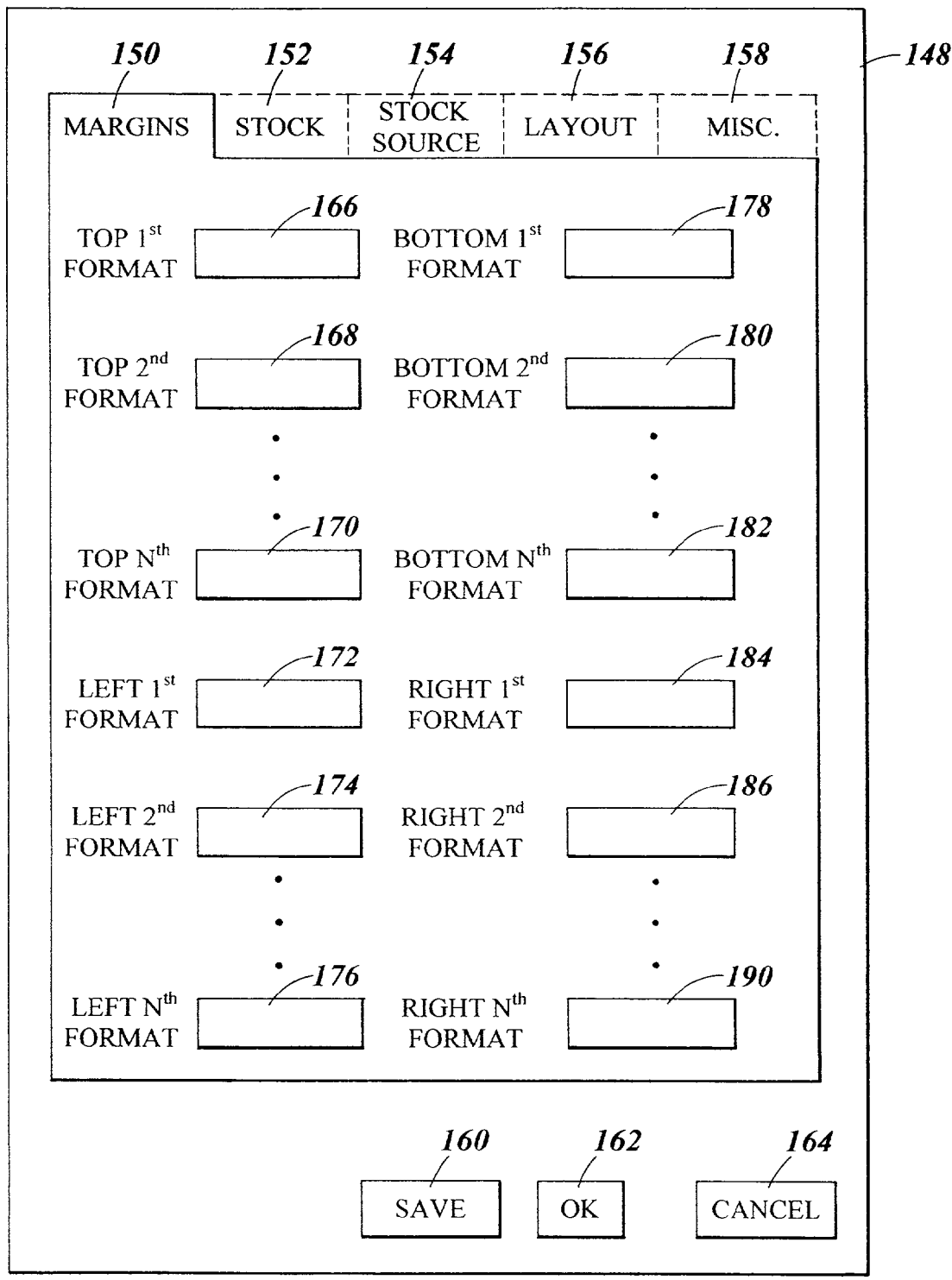
FIG. 14 depicts a user interface window for selecting properties of a printer in more detail.

In FIG. 14, printer graphical user interface 94 includes graphical user interface window 148. Graphical user interface window 148 is deployed once an operator selects and available printer and selects properties button 284. Graphical user interface window 148 includes several tab control elements such as, margins 150, stock 152, stock source 154, image layout 156, and miscellaneous 158. One skilled in the art will appreciate that the tab control elements illustrated in FIG. 14 are for illustrative purposes and that tab control elements may be added or deleted to graphical user interface window 148 without departing from the scope of the present invention.

When an operator has finished selecting the desired image forming properties for one or more of the image forming devices, an operator may save the selected image forming properties by selecting the SAVE button 160 (step 138 in FIG. 12) or may initiate imaging by selecting OK button 162 (step 140 in FIG. 12). If the operator saves the image forming properties, the properties are encapsulated into an object (step 144 in FIG. 12) and a visual representation, such as, an icon is generated that represents the encapsulated properties (step 146 in FIG. 12). While the imaging control facility 22 is generating the visual representations of the encapsulated properties, imaging control facility 22 may forward the selected electronic document from software application 24 to the appropriate image forming devices for imaging (step 148 in FIG. 12). If the operator chooses not to accept or save the selected image forming properties, the operator may select the CANCEL button 164 to cancel or undo the selected properties (step 145 in FIG. 12).

With reference to FIG. 14, tab control element 150 allows the operator of electronic host apparatus 10 to set the margin limits for each imaging format of the selected electronic document. For example, an operator may use list box 166 to select a top margin setting for the first imaging format, list box 168 to select a the top margin setting for the second imaging format, and so on, until the operator has set the top margin requirement for the final or Nth imaging format of the electronic document as depicted by first box 170. In like manner, an operator may select a bottom margin setting from list box 178 for the first imaging format, a bottom margin setting from list box 180 for the second imaging format, and a bottom margin setting from list box 182 for the Nth imaging format. Further, an operator may select a left margin setting for the first imaging format from list box 172, a left margin setting for the second imaging format from list box 174, and a left margin setting for the Nth imaging format from list box 176. Likewise, an operator may select a right margin setting for the first imaging format from list box 184, a right margin setting for the second imaging format from list box 186, and a right margin setting for the Nth imaging format from list box 190. Moreover, graphical user interface window 148 also provides an operator with SAVE button 160 to save the selected imaging format property settings for the selected printer, OK button 162 to initiate imaging with the selected imaging format property settings, and CANCEL button 164 to close the graphical user interface window without saving the selected image forming properties.

Figure 15:
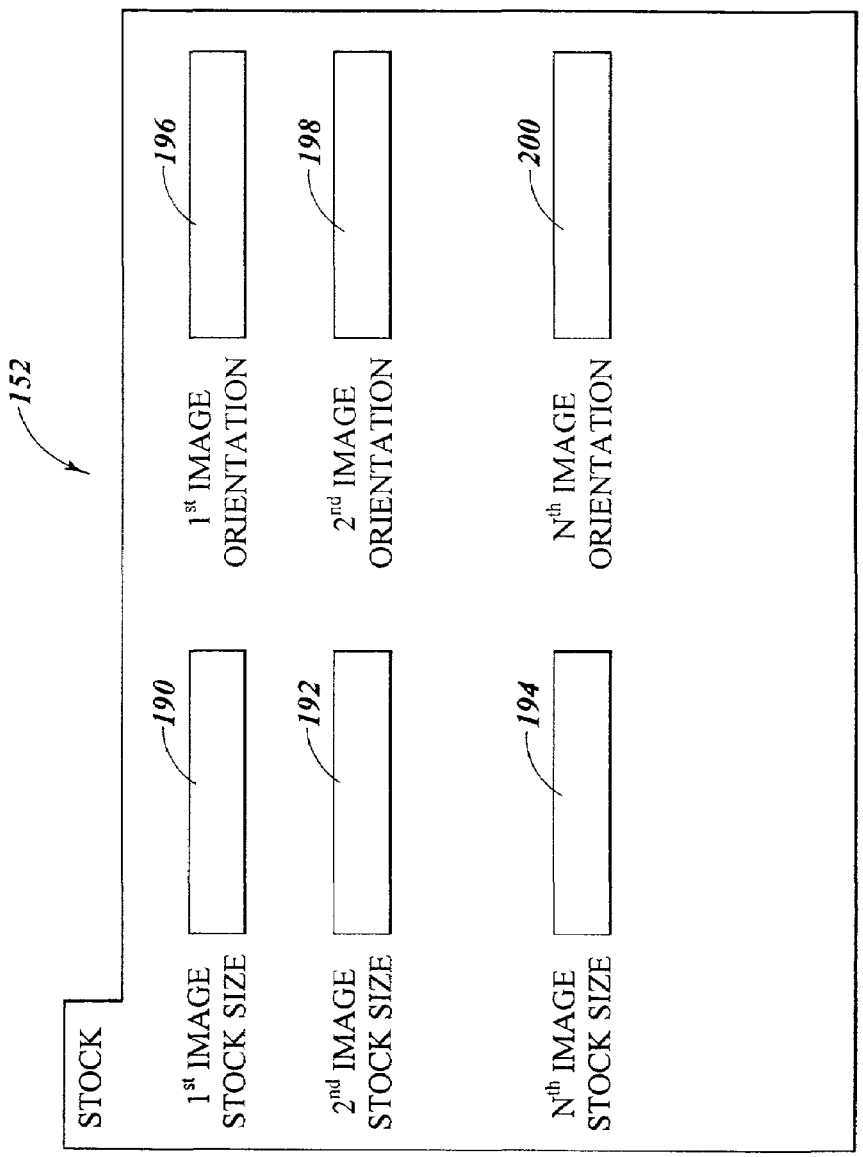
FIG. 15 depicts a user interface window for selecting a stock size and image orientation for each imaging format in the illustrative embodiment.

FIG. 15 depicts tab control element 152 in more detail. From tab control element 152, an operator can select a stock size for the first imaging format from list box 190, for example, 8"×11" for the first imaging format, a stock size from list box 192 for the second imaging format, and a stock size for the Nth imaging format from list box 194. The stock size properties depicted in tab control element 152 refer to conventional stock sizes, such as, A3, A4, legal, and the like. In addition, tab control element 152 allows the operator to select an orientation for each imaging format, such as, portrait orientation or landscape orientation. An operator may select the orientation for the first imaging format from list box 96, the imaging orientation for the second imaging format from list box 198, and in like manner, the imaging orientation for the Nth imaging format orientation from list box 200.

Figure 16:
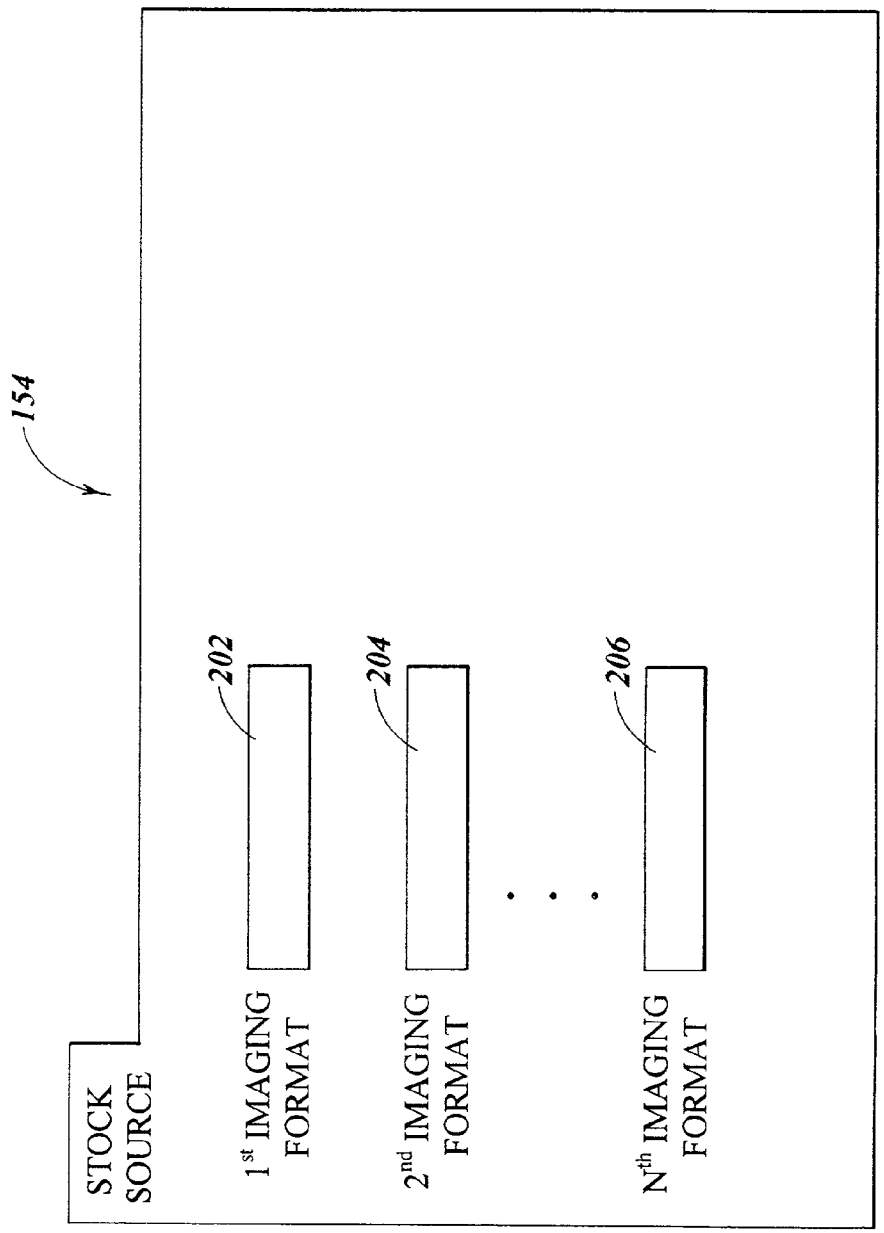
FIG. 16 depicts a user interface window for selecting a stock source for each imaging format in the illustrative embodiment.

As depicted by FIG. 16, tab control element 154 allows the operator to select a stock source for each imaging format. An operator may select a first stock source from the first imaging format list box 202, a second stock source for the second imaging format from list box 204, and if necessary, a stock source for the Nth imaging format from list box 206.

Figure 17:
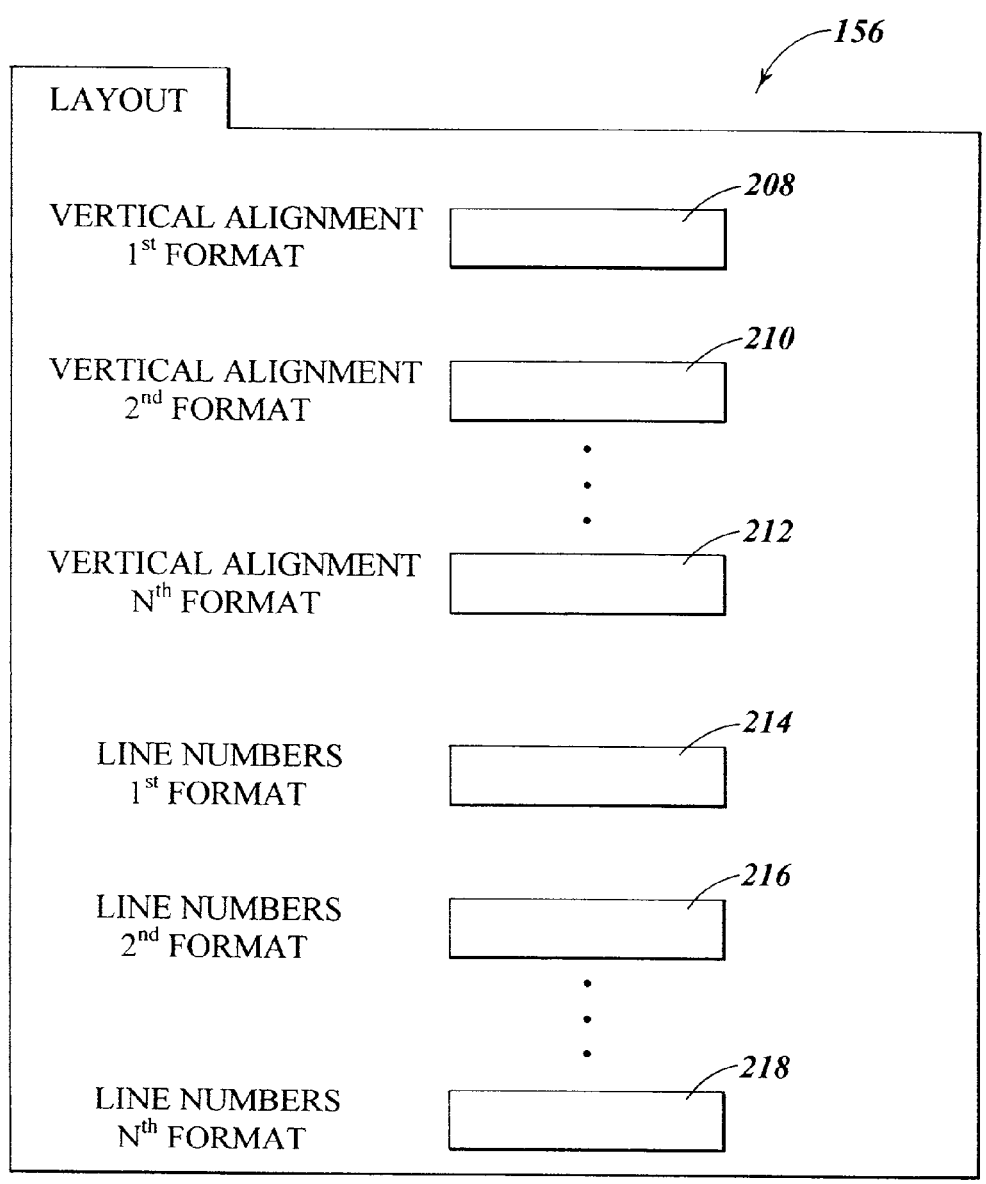
FIG. 17 depicts a user interface window for selecting a layout for each imaging format in the illustrative embodiment.

FIG. 17 illustrates tab control element 156 in more detail. An operator of electronic host apparatus 10 may use tab control element 156 to control the vertical alignment of the first imaging format using list box 208, the vertical alignment of the second imaging format using list box 210, and in like manner, control the vertical alignment of the Nth imaging format using list box 212. Typical vertical alignments include top aligned, center aligned, or justified. Layout tab control element 156 also allows an operator to select the use of line numbers for the first imaging format using list box 214, or the use of line numbers for the second imaging format in list box 216, and in like manner, allows the operator to select the use of line numbers for the Nth imaging format using list box 218. One skilled in the art will recognize that the illustrated tab control elements in graphical user interface window 148 may contain additional image forming property options that are specific to software application 24 or to the selected image forming device.

Figure 18:
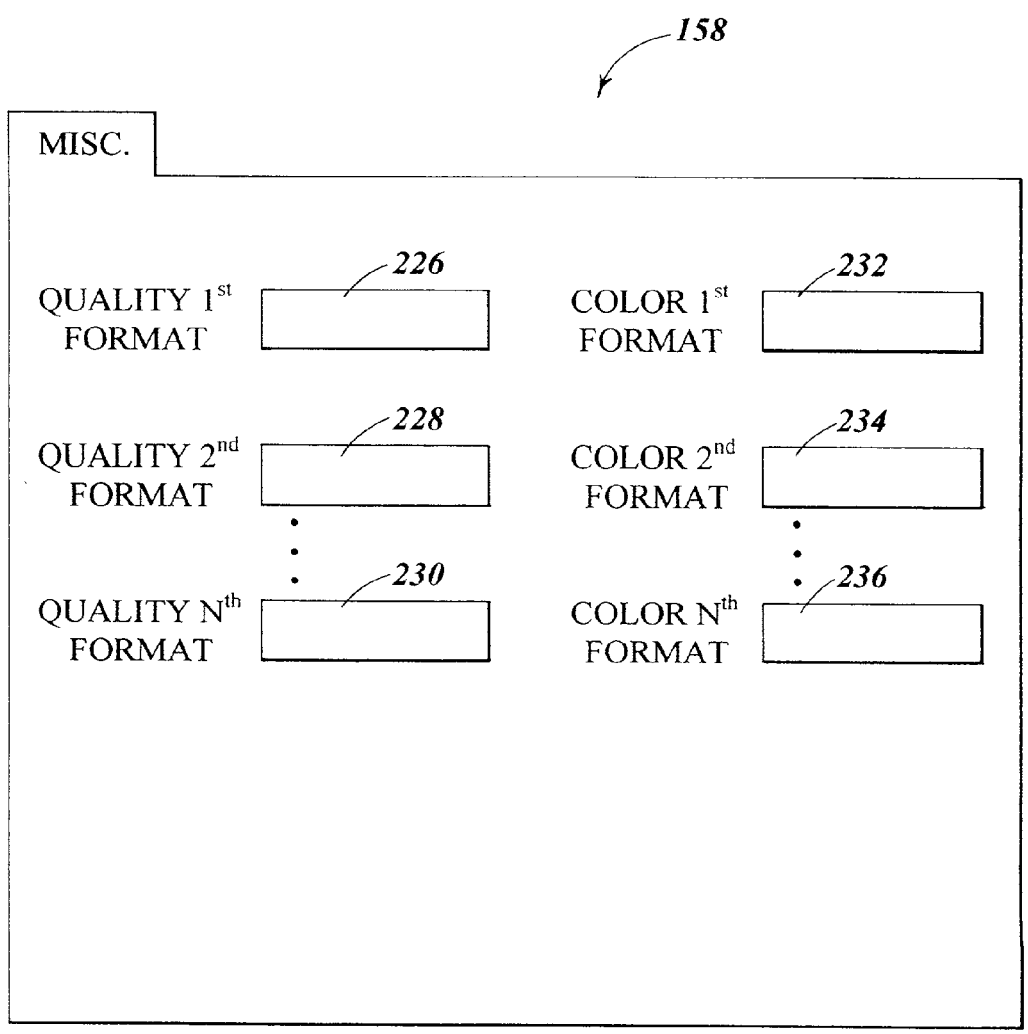
FIG. 18 depicts a user interface window for selecting additional image forming device properties for each imaging format in the illustrative embodiment.

An operator utilizing miscellaneous tab control element 158, as illustrated in FIG. 18, may select a desired quantity of the first imaging format from list box 226, may select a desired quantity of the second imaging format from list box 228, and correspondingly, the operator may select the quantity desired of the Nth imaging format desired from list box 230. Miscellaneous tab control element 158 also allows an operator to select a color format for the first imaging format from list box 232, a color format for the second imaging format from list box 234, and in similar fashion, a color format for the Nth imaging format from list box 236. For ease of explanation, the various tab control elements have been described using list boxes and one skilled in the art will recognize that other graphical user interface elements such as text boxes and check boxes may be used to populate the various tab control elements.

When an operator has completed tabbing through the associated tab control elements for the selected image forming device, the operator can save the selected properties for the selected image forming device by selecting SAVE button 160, or may select the OK button 162 to initiate the imaging of the electronic document without saving the selected properties. If the operator wishes to utilize more than one image forming device (step 136 in FIG. 12), the operator returns to user interface window 274 and selects another desired image forming device (step 132 in FIG. 12).

Figure 19:
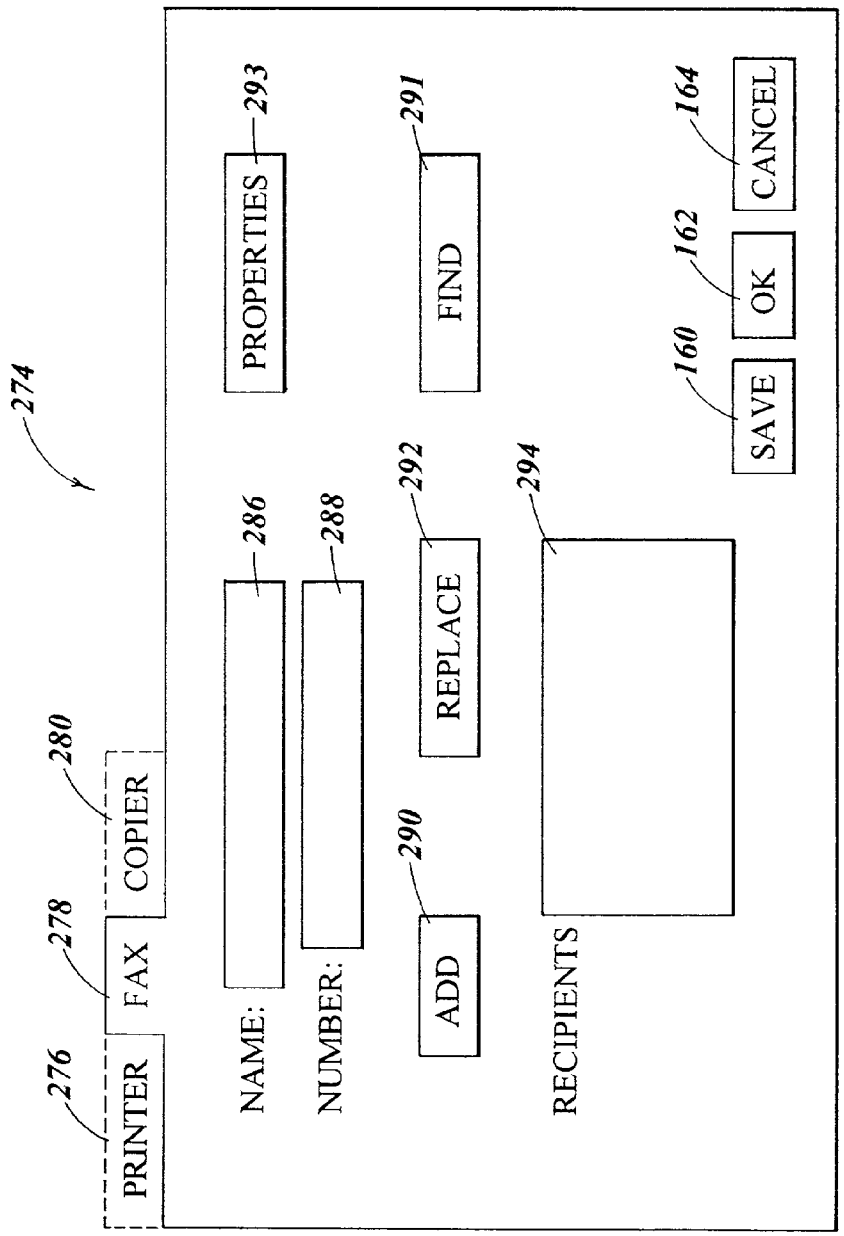
FIG. 19 depicts a user interface window suitable for use in selecting properties of a facsimile machine in the illustrative embodiment.

FIG. 19 illustrates the selection of tab control element 278, which invokes facsimile user interface 92 to provide the properties of facsimile machine 62 in a graphical format. List box 286 allows the operator to select or insert the name of an intended facsimile recipient. Tab control element 278 also provides list box 288 for the selection or the insertion of the corresponding recipient facsimile number. The imaging control facility 22 may create a facsimile cover sheet from the information provided in list box 286, and 288 by using a substitution method that reads the content in each list box and inserts the content into one or more corresponding fields of a facsimile cover sheet template. Alternatively, the imaging control facility 22 may use the content in list box 286 and 288 to access an operator's address book for the content required to generate the facsimile cover sheet.

In addition, tab control element 278 provides an ADD button 290 that allows the operator to add the name entered in the list box 286 and the associated facsimile number entered in list box 288, to an address book stored on storage element 12. An operator may use the REPLACE button 292 to update an existing address book entry with the contact information inserted into list box 286 and 288. Also included is FIND button 291 that allows the operator to search an address book or similar file, to find a desired facsimile recipient and their associate facsimile number.

Text box 294 is provided to the operator to indicate the selected facsimile recipients. When an operator of electronic host apparatus 10 has finished identifying the intended recipients of the facsimile transmission, the operator may select SAVE button 160 to encapsulate the settings into a facsimile cover sheet that identifies the selected recipients for future use, or may select the OK button 162 for initiating the transmission of the facsimile without saving the facsimile cover sheet as a template, or may select the CANCEL button 164 to cancel the facsimile transmission.

Figure 20:
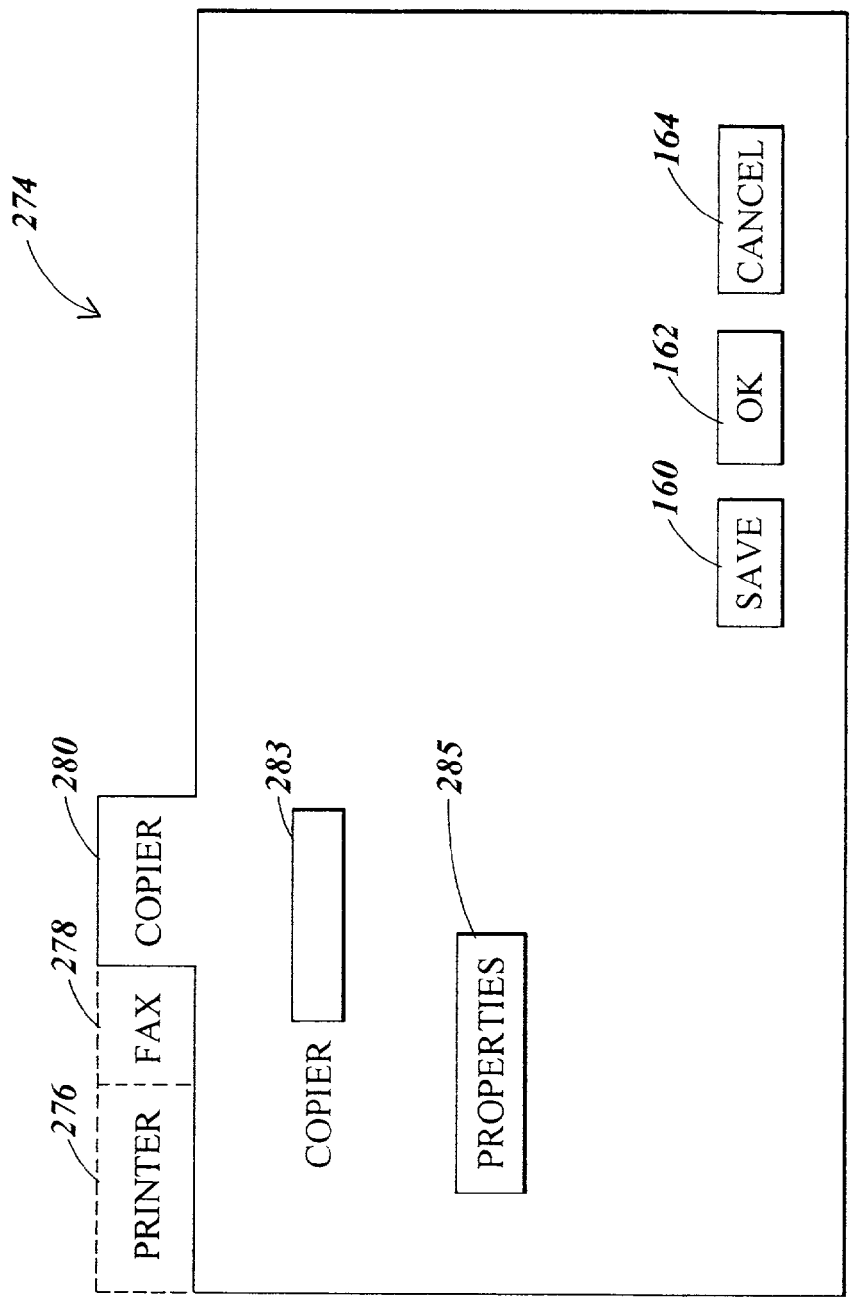
FIG. 20 depicts a user interface window suitable for use in selecting properties of a xerographic copier in the illustrative embodiment.

FIG. 20 depicts tab control element 280 of the user interface window 274 that allows an operator to select a desired xerographic copier from list box 283 and to select the desired image forming properties of the selected xerographic copier using button 285. Selecting properties button 285 invokes graphical user interface 149 illustrated in FIG. 21. Graphical user interface 149 provides various tab control elements for selecting the image forming properties of the selected xerographic copier. Tab control element 280 and graphical user interface 149 is provided by xerographic copier user interface 90.

Figure 21:
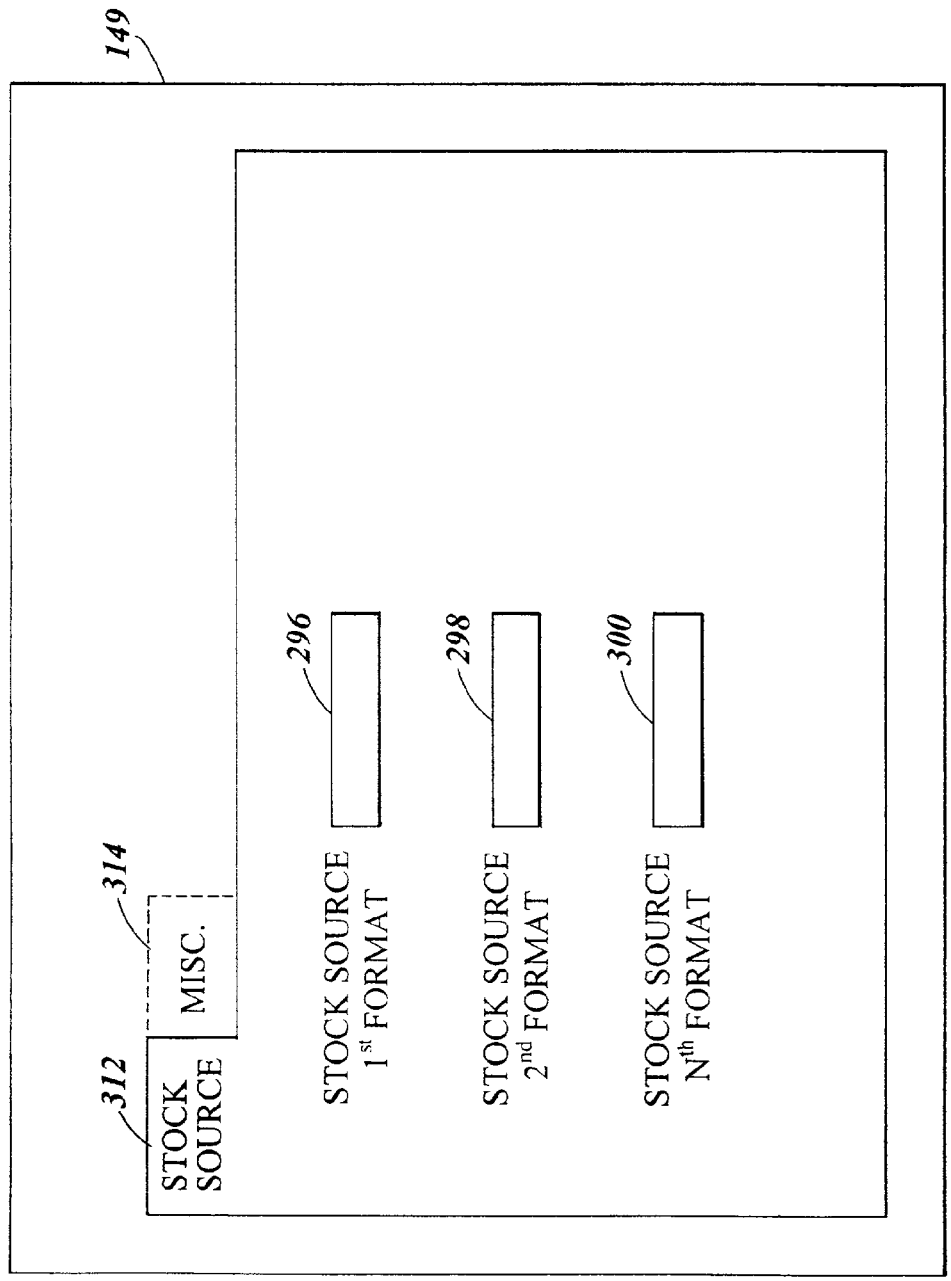
FIG. 21 depicts a user interface window suitable for selecting a stock source in a xerographic copier in the illustrative embodiment.
Figure 22:
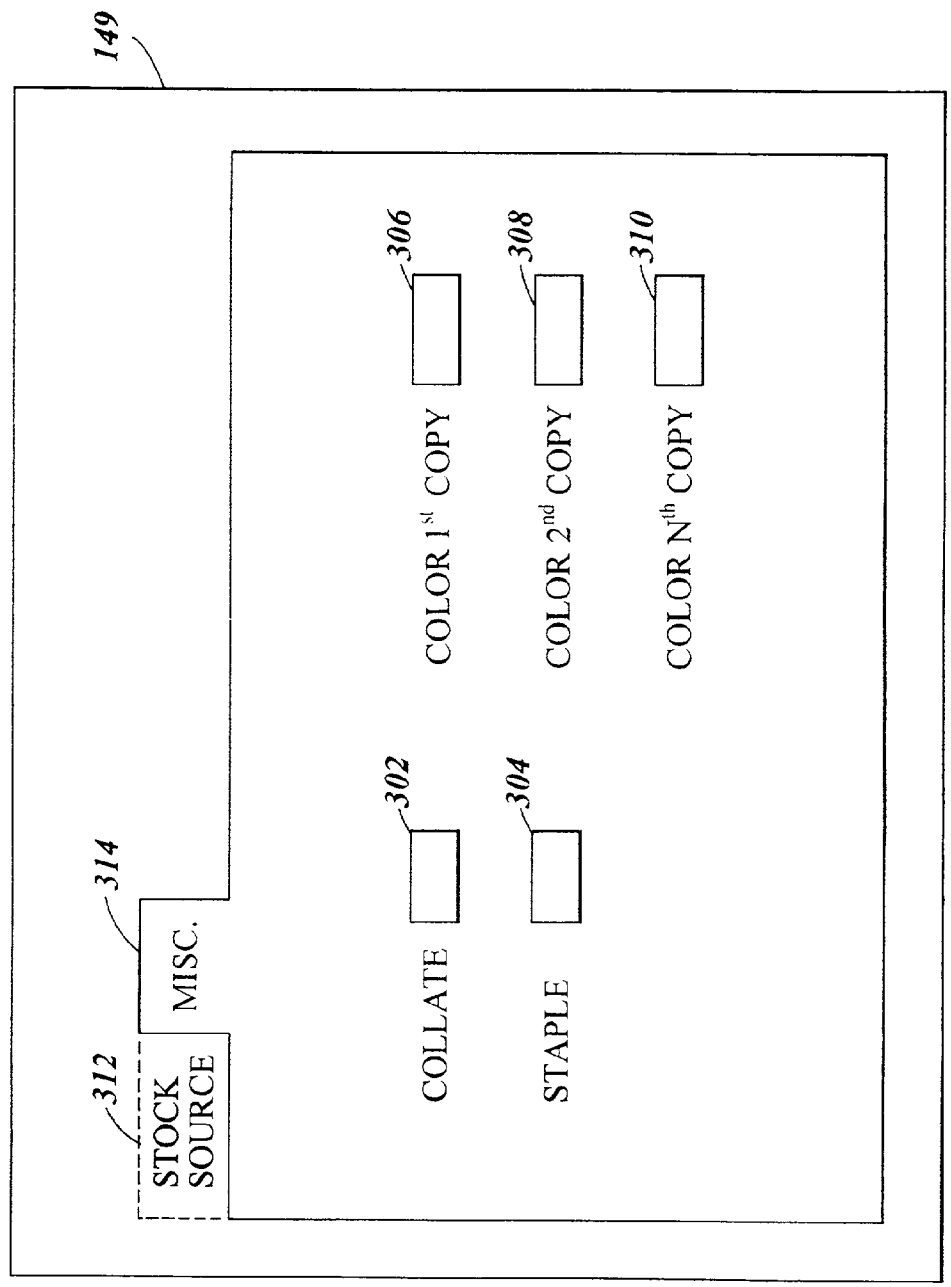
FIG. 22 depicts a user interface window suitable for selecting additional properties of a xerographic copier in the illustrative embodiment.

As illustrated in FIG. 21, a stock source tab control element 312 is presented on the display of electronic host apparatus 10. Tab control element 312 allows the operator to select a stock source for a first imaging format using list box 296, and allows the operator to select a stock source for a second imaging format from list box 298, and also allows the operator to select a stock source for an Nth imaging format from list box 300.

In similar fashion, miscellaneous tab control element 314 of graphical user interface window 149 allows an operator to select additional properties of the selected xerographic copier. Additional properties may include the selection of a collating option using check box 302, or selecting a staple option using check box 304. Further, an operator may select a color format for the first imaging format using list box 306, a color format for the second imaging format from list box 308, and may select a color format for the Nth imaging format from list box 310. One skilled in the art will appreciate that graphical user interface 149 may display additional xerographic copier properties depending on the property options available for the selected xerographic copier.

With reference to FIG. 4, the imaging control library 23 is held by storage device 12. The imaging control library 23 is a depository for the objects that encapsulate the selected attributes for a selected image forming device to image an electronic document in multiple imaging formats. These objects include methods for displaying visual representations of each encapsulated multiple imaging format process in the imaging control library window 1 illustrated in FIG. 23. It should be appreciated that imaging control library 23' may also be located remotely on server 50 as depicted in FIG. 4. Communication with the remote imaging control library 23' may be realized via the network interface 72 in electronic host apparatus 10.

Figure 23:
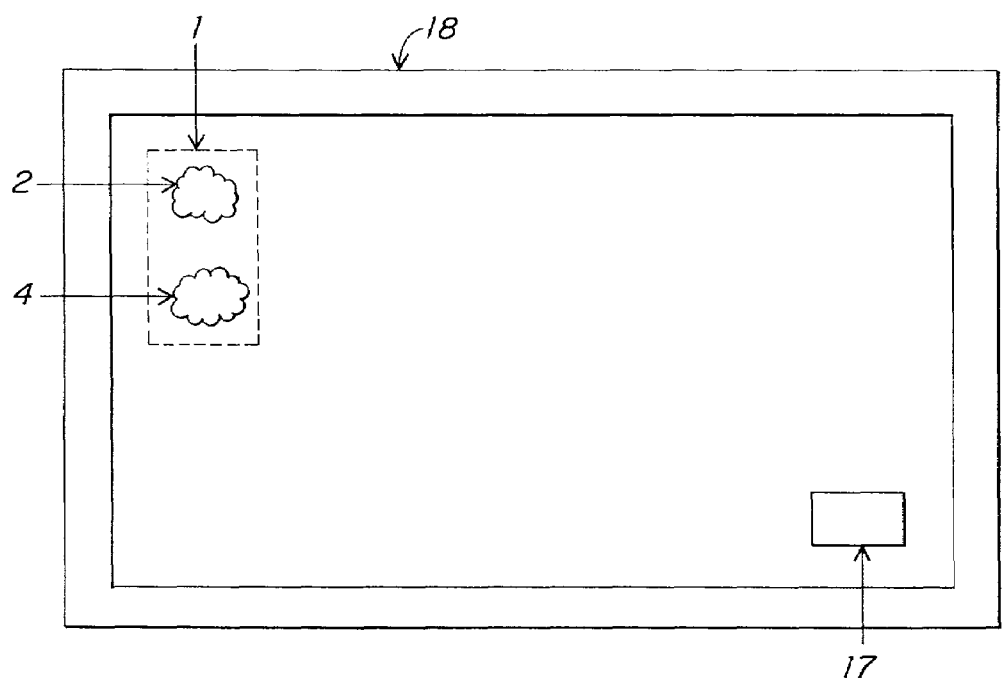
FIG. 23 depicts an icon in the imaging control library and a drag and drop target area.

As shown in FIG. 23, imaging control facility 22 may implement imaging control library 23 as a drag and drop facility that allows an operator to drag one of the icons out of the imaging control library window 1 and drop the selected icon onto a target area 17 to configure one or more of the image forming devices associated with the selected icon. The operator may drag an icon by using mouse 16, keyboard 14, or other suitable device. When the operator drops the icon such as, icon 2 or icon 4 onto the target area 17 the selected image forming device or image forming devices are then configured with the properties associated with the icon that was dropped to generate multiple imaging formats of an electronic document.

From a programmatic perspective, the object associated with icon 2, or icon 4, receives an event message at the beginning of the drag and drop operation that informs the associated object that a cursor is positioned over the icon for the object. If the operator selects the icon, by pressing a mouse button or other suitable technique, the associated object receives an event message indicating that the operator has selected the icon. When the operator begins to move the selected icon, the object knows that the operator is attempting to conduct a drag and drop operation and the icon is displayed in phantom. When the phantom image of the icon is dropped in the target window 17, the target application that displays target window 17 knows that a drop has been performed and that the appropriate response is to extract the attributes from the object associated with the phantom icon and to configure the associated image forming device or devices with the encapsulated attributes.

Those skilled in the art will appreciate that the image forming devices and their associated properties depicted by the graphical representations of the graphical user interface are not limited solely to the descriptions and depictions provided above. For example, an operator may select a property for a xerographic copier that produces a double-sided image format or a property of the xerographic copier that can punch one or more holes in the imaging medium.

While the present invention has been described with reference to an illustrative embodiment thereof, those skilled in the art will appreciate that various changes in the form and detail may be made without departing from the intended scope of the present invention as defined in the appended claims.

What is claimed is:

1. A method of processing an electronic image from an electronic device having a display that is visible to a user, the method comprising the steps of:
   selecting property options from image forming devices from the display to create multiple imaging formats of the electronic image;
   generating the multiple imaging formats of the electronic image on the image forming devices in response to a selected command, wherein at least one of the image forming devices has at least two imaging formats, different from each other; and
   imaging, automatically without a user intervention, the multiple formats on the image forming devices including the image forming device having at least two imaging formats.

2. The method of claim 1, further comprising the step of, encapsulating the selected properties of the image forming devices into selected objects.

3. The method of claim 2, further comprising the step of, generating a visual representation of the selected objects on the display, wherein selection of the visual representations initiates the generation of the multiple imaging formats of the electronic image on the image forming devices.

4. The method of claim 1, wherein the image forming devices comprise at least two of a printer, a copier a facsimile machine, a personal data assistant (PDA), a mobile telephone and a digital camera.

5. The method of claim 1, wherein the property options of the image forming devices comprise a stock selection, a color selection, and a quantity selection of each imaging format.

6. The method of claim 1, wherein the electronic image is an electronic document.

7. The method of claim 3, wherein the visual representation is a button on a toolbar.

8. The method of claim 1, wherein the image forming device having multiple formats is one of a copier or a printer and the multiple formats are a color image format and a black-and-white image format.

9. An image reproducing system comprising:
   an image forming device comprising one of a printer, a copier, a facsimile machine, a personal data assistant (PDA), a mobile telephone and a digital camera;
   an input device;
   an image host device having a display; and
   an image control facility for configuring the one or more image forming devices for generating one or more depictions of an image from the image host device when an image reproducing command is selected.

10. The system of claim 9, wherein the control facility resides in image forming device.

11. The system of claim 9, wherein the control facility resides in the image host device.

12. The system of claim 9, wherein the image reproducing command is represented by a button on a toolbar.

13. The system of claim 9, further comprising an imaging control library that provides visual representations of one or more property configurations for the one or more image forming devices.

14. The system of claim 13, wherein the one or more visual representations of the one or more image forming devices are one or more visual representations of an object that encapsulates attributes of the one or more image forming devices property configurations to generate multiple imaging formats of an image from the image host device.

15. The system of claim 14, further comprising a drag and drop facility for supporting the dragging and dropping of the selected visual representation of the imaging control facility library, by the user input device.

16. The system of claim 9, wherein the imaging control facility configures the one or more image forming devices to generate the one or more depictions of the image from the image host device in response to a drag and drop of the selected visual representation.

17. The system of claim 9, wherein the image control facility is configured to generate a plurality of formats to generate more than one depiction of the image in more than one format, and at least one image forming device was at least two imaging formats different from each other.

18. A computer readable medium holding computer executable instructions for performing a method on an image reproduction system comprising one or more image forming devices, a host device having a display to a view an image in an electronic format and an input device, said method, comprising the steps of:

displaying properties of the one or more image forming devices on the host device;

selecting the properties of the one or more image forming devices to generate one or more imaging formats of the image from the host device; and generating the one or more imaging formats of the image at the one or more image forming devices in response to a selected command, wherein at least two distinct imaging formats are located on one image forming device.

19. The computer readable medium of claim 18, further comprising the step of, encapsulating the selected properties of the one or more image forming devices into a selected object.

20. The computer readable medium of claim 19, further comprising the step of, generating a visual representation of the selected object on the host device, wherein the selection of the visual representation initiates the generation of the one or more imaging formats of the electronic image on the one or more image forming devices.

21. The computer readable medium of claim 18, wherein the host device has a microprocessor.

22. The computer readable medium of claim 18, wherein an image is an electronic document.

23. The computer readable medium of claim 20, wherein the visual representation comprises one of a button and an icon.

24. The computer readable medium according to claim 18, wherein the at least one image forming device are a plurality of image forming devices including at least one of a printer, a copier, a facsimile machine, a personal data assistant (PDA), a mobile telephone and a digital camera.

* * * * *